United States Patent
Cho et al.

(10) Patent No.: US 12,463,435 B2
(45) Date of Patent: Nov. 4, 2025

(54) CHARGING INTEGRATED CIRCUIT AND OPERATING METHOD

(71) Applicant: SAMSUNG ELECTRONICS CO., LTD., Suwon-si (KR)

(72) Inventors: Sungkyu Cho, Hwaseong-si (KR); Minkyu Kwon, Hwaseong-si (KR); Sungwoo Lee, Hwaseong-si (KR); Taejin Jeong, Incheon (KR); Daewoong Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 18/502,827

(22) Filed: Nov. 6, 2023

(65) Prior Publication Data

US 2024/0079883 A1    Mar. 7, 2024

Related U.S. Application Data

(63) Continuation of application No. 17/035,921, filed on Sep. 29, 2020, now Pat. No. 11,837,887.

(30) Foreign Application Priority Data

Oct. 10, 2019    (KR) .................. 10-2019-0125680

(51) Int. Cl.
*H02J 7/00* (2006.01)
*H02J 50/80* (2016.01)

(52) U.S. Cl.
CPC ........ *H02J 7/00034* (2020.01); *H02J 7/0031* (2013.01); *H02J 7/0036* (2013.01); *H02J 50/80* (2016.02); *H02J 2207/30* (2020.01)

(58) Field of Classification Search
USPC .................. 320/106, 107, 108, 109, 110
See application file for complete search history.

(56) References Cited

U.S. PATENT DOCUMENTS

| 5,475,856 A | 12/1995 | Kogge |
| 5,963,012 A | 10/1999 | Garcia et al. |

(Continued)

FOREIGN PATENT DOCUMENTS

| KR | 10-2012-0001280 A | 1/2012 |
| KR | 10-2014-0102268 A | 8/2014 |

(Continued)

OTHER PUBLICATIONS

Partial European Search Report in European Appln. No. 20201001.3, mailed on Feb. 23, 2021, 15 pages.

(Continued)

*Primary Examiner* — Brian Ngo
(74) *Attorney, Agent, or Firm* — Fish & Richardson P.C.

(57) ABSTRACT

A charging integrated circuit (IC) in a mobile device including battery includes; a switching charger including at least one inductor, a direct charger including at least one capacitor, and a control circuit. The control circuit detects a connection between the mobile device and an external power unit and a disconnection between the mobile device and the external power unit, wherein the switching charger and the direct charger selectively receive an external power signal provided by the external power unit by the connection between the mobile device and an external power unit. Upon detecting the connection between the mobile device and an external power unit, the charging IC activates the direct charger and provides a constant charging current to the battery using the direct charger, and upon detecting the disconnection between the mobile device and an external power unit, the charging IC deactivates the direct charger, activates the switching charger, and maintains a battery voltage associated with the battery using the switching charger.

18 Claims, 17 Drawing Sheets

(56) References Cited

U.S. PATENT DOCUMENTS

| | | |
|---|---|---|
| 7,653,366 B2 | 1/2010 | Grigore |
| 8,164,932 B2 | 4/2012 | Sims et al. |
| 8,686,688 B2 | 4/2014 | Han et al. |
| 8,823,272 B2 | 9/2014 | Trainor et al. |
| 8,823,319 B2 | 9/2014 | Von Novak, III et al. |
| 8,855,554 B2 | 10/2014 | Cook et al. |
| 8,917,057 B2 | 12/2014 | Hui |
| 10,547,187 B2 | 1/2020 | Yoon et al. |
| 2016/0087462 A1 | 3/2016 | Kudo et al. |
| 2017/0085098 A1* | 3/2017 | Sporck .............. H02J 7/007194 |
| 2017/0368957 A1 | 12/2017 | Lei |
| 2018/0041060 A1 | 2/2018 | Walley et al. |
| 2019/0006871 A1 | 1/2019 | Barsukov et al. |
| 2020/0177010 A1 | 6/2020 | Tamoto |
| 2021/0004065 A1 | 1/2021 | Chandra et al. |
| 2021/0075244 A1 | 3/2021 | Cho et al. |

FOREIGN PATENT DOCUMENTS

| | | |
|---|---|---|
| KR | 10-2017-0103546 A | 9/2017 |
| KR | 20180116532 A * | 10/2018 |
| WO | WO 2013151728 | 10/2013 |

OTHER PUBLICATIONS

Office Action in Korean Appln. No. 10-2019-0125680, mailed on Jan. 20, 2025, 17 pages.

* cited by examiner

CHARGING INTEGRATED CIRCUIT AND OPERATING METHOD

CROSS-REFERENCE TO RELATED APPLICATION

This application is a continuation of U.S. application Ser. No. 17/035,921, filed Sep. 29, 2020, which claims priority to Korean Patent Application No. 10-2019-0125680, filed in the Korean Intellectual Property Office on Oct. 10, 2019, the subject matter of each is hereby incorporated by reference.

BACKGROUND

The inventive concept relates to charging integrated circuits capable of controlling the charging of a battery, and associated operating methods.

Mobile electronic devices (hereafter, mobile devices) are typically powered for considerable periods of time by a battery integral to the mobile device. However, power demands placed upon the battery have increased over time with rising performance and functionality demands. Hence, battery capacity (e.g., the amount of electrical charge the battery is capable of providing to the mobile device) and battery life (e.g., the time period between successive requirements for battery charging) have become important design considerations. Different battery charging options are often provided in view of consumer demands. Hence, mobile devices may be charged at different rates depending on the magnitude (or level) of an applied charging voltage (i.e., the level of a voltage provided by a charger to the battery of a mobile device). Different battery charging methods may include a rapid charging method and a general charging method.

SUMMARY

The inventive concept provides a charging IC including a switching charger and a direct charger, wherein the charging IC is capable of efficiently charging a battery without requirement of control by a control unit such as an application processor.

According to an aspect of the inventive concept, there is provided a charging integrated circuit (IC) in a mobile device including battery, the charging IC including; a switching charger including at least one inductor, and a direct charger including at least one capacitor, and a control circuit configured to detect a connection between the mobile device and an external power unit and a disconnection between the mobile device and the external power unit, wherein the switching charger and the direct charger selectively receive an external power signal provided by the external power unit by the connection between the mobile device and an external power unit. Upon detecting the connection between the mobile device and an external power unit, the charging IC activates the direct charger and provides a constant charging current to the battery using the direct charger, and upon detecting the disconnection between the mobile device and an external power unit, the charging IC deactivates the direct charger, activates the switching charger, and maintains a battery voltage associated with the battery using the switching charger.

According to another aspect of the inventive concept, there is provided a method of operating a charging integrated circuit (IC) in a mobile device including battery. The method includes; upon detecting a connection between the mobile device and an external power unit providing an external power signal, activating a direct charger and using the direct charger to charge the battery with a constant current associated with an external power signal during a constant charge (CC) section of a battery charging process, and upon detecting an end of the CC section, charging the battery with a charging power different from using the direct charger to charge of the battery with the constant current associated with the external power signal during a constant voltage (CV) section of the battery charging process.

According to another aspect of the inventive concept, there is provided a mobile device including; a battery embedded in the electronic device, and a charging integrated circuit (IC) chip configured to charge the battery with a constant current using a direct charger during a constant current (CC) section of a battery charging process, and to hereafter charge the battery with a constant voltage during a constant voltage (CV) section of the battery charging process,
wherein a level of the constant current is defined by an external power signal provided by an external power unit when the externa power unit is connected to the mobile device.

BRIEF DESCRIPTION OF THE DRAWINGS

Embodiments of the inventive concept will be more clearly understood upon review of the following detailed description taken in conjunction with the accompanying drawings in which.

DETAILED DESCRIPTION

Hereinafter, embodiments of the inventive concept will be described in some additional detail with reference to the accompanying drawings.

Figure (FIG.) 1 is a block diagram of a mobile device 100 and an external power unit 200 according to an embodiment of the inventive concept. The mobile device 100 and the external power unit 200 may be variously connected in one or more hardwired configurations and/or one or more wireless configurations.

The mobile device 100 may take many different forms, such as a smart phone, a tablet personal computer (PC), a mobile phone, a Personal Digital Assistant (PDA), a laptop computer, a wearable electronic device, a Global Positioning System (GPS) device, an e-book terminal, a digital broadcasting terminal, an MP3 player, a digital camera, an electronic vehicle, etc. As will be appreciated by those skilled in the art, the term "mobile device" in this context refers to any electronic device capable being operated by a user without requirement for the device to be continuously hardwire-connected to a power source external to the device.

Figure 1:
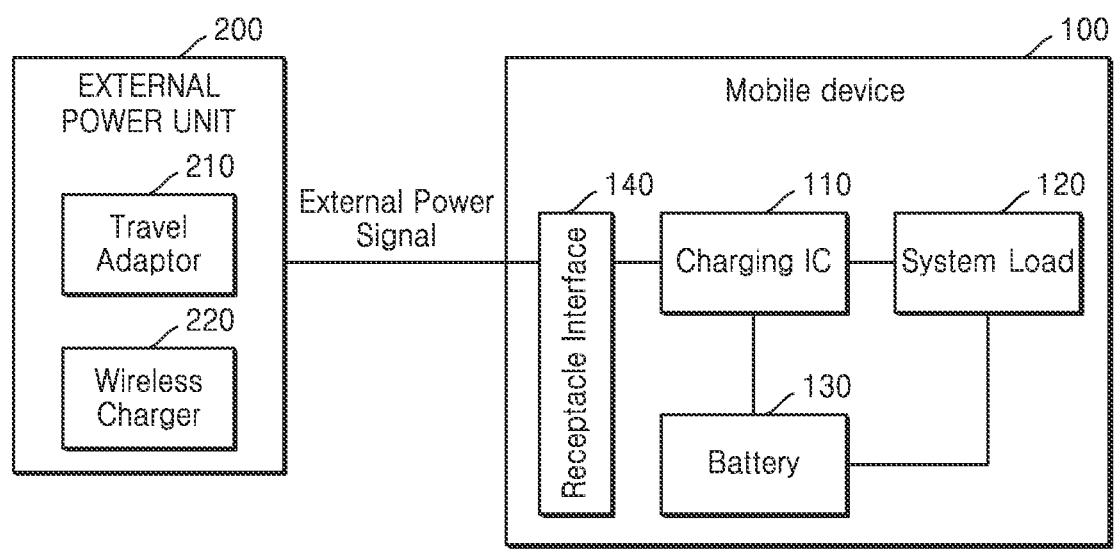
FIG. 1 is a block diagram of a mobile device according to an embodiment of the inventive concept.

In the illustrated example of FIG. 1, the mobile device 100 includes a battery 130 and a charging integrated circuit (IC) 110 that may be variously configured to charge the battery 130. Thus, the charging IC 110 may be considered to be a battery charger (i.e., a circuit that is used, wholly or in part, to provide electrical charge to a battery).

The charging IC 110 may be variously implemented. For example, the charging IC may be an integrated circuit chip or set of chips mounted on a printed circuit board (PCB). However physically implemented, the charging IC 110 may receive an external power signal from the external power unit 200. The external power signal may be variously provided in one or more forms (e.g., waveform(s), power level(s), application timing, etc.) consistent with one or more charging requirements and/or approaches to battery charging.

As suggested by the illustrated example of FIG. 1, the external power signal may be applied to the charging IC 110 of the mobile device 100 through a receptacle interface 140 using a hardwire connection (e.g., the travel adaptor 210) or a wireless connection (e.g., the wireless charger 220). Regardless of its particular form or connection configuration, the external power signal may be used to charge (i.e., provide electrical charge and/or electrical current—hereafter generically referred to as "charging power") the battery 130. In the illustrated embodiment of FIG. 1, the charging IC 110 may be used to control the charging of the battery 130 in the mobile device 100 in view of a variable system load 120. A more detailed example of the charging IC 110 will be described hereafter with reference to FIG. 2.

The battery 130 may take one of many different forms. For example, the battery 130 may be a multi-cell battery including multiple, series-connected battery cells. Alternately, the battery 130 may be a single-cell battery including only a single battery cell. Regardless of the particular configuration of the battery 130, when the mobile device 100 is connected to the external power unit 200, the battery 130 may receive charging power through the operation of the charging IC 110. Once the battery 130 is sufficiently charged, the power requirements of the variable system load 120 within the mobile device 100 may be meet.

As will be appreciated by those skilled in the art, the system load 120 shown in FIG. 1 is a dynamic element that may be understood as a conceptual aggregation of varying power requirements within the mobile device 100. That is, the system load 120 may vary with the configuration and/or current operating functions of the mobile device 100. Components commonly included in the mobile device 100, albeit not shown in FIG. 1 for the sake of clarity, include a display, an application processor, a communication processor, a speaker, a camera, a memory, and the like. These components, or more particularly the power demand(s) associated with the operation of the these components, may be part of the system load 120. In actual implementation these components variously include integrated circuits, chips, modules, operation blocks, functional blocks, and intellectual property (IP) blocks included in the mobile device 100.

Hence, the system load 120 may be understood, at least at one conceptual level, as an aggregation of electrical power demand(s) within the mobile device 100 that may be fulfilled (or meet) by the battery 130 and/or the external power unit 200, if the external power unit 200 is connected to the mobile device 100.

The receptacle interface 140 may be various configured to connect with the mobile device 100. For example, the receptacle interface 140 may connect the mobile device 100 with the external power unit 200 via a universal serial bus (USB) cable. In different embodiments of the inventive concept, the receptacle interface 140 may be a USB type-C interface, and the USB cable may be a USB type-C cable—where the USB type-C interface is configured in accordance with the publicly available and well understood standards, such as those established by USB 2.0 or USB 3.1. The receptacle interface 140 may include a plurality of electrical connection pins (hereafter, "pins"), wherein the pins may include one or more power supply pin(s), data pin(s), and/or channel configuration (CC) pin(s), etc.

It should be noted at this point that the external power unit 200 may take many different forms, provide different connection and power configurations, and/or enable a variety of functions, depending of the design of the mobile device 100 and the external power unit 200. To describe exemplary battery charging approaches that may be used in relation to embodiments of the inventive concept, the external power unit 200 of FIG. 1 is shown as including the travel adaptor 210 and the wireless charger 220, but these are just selected examples. Those skilled in the art will recognize that the external power unit 200 may include more, fewer or different components, and correspondingly enable different battery charging approaches.

Recognizing that the external power unit 200 may (or may not) be configurable to connect with the mobile device 100 via a hardwire connection (e.g., a conventional plug-in connection to a 110 AC or 220 AC electrical line), the wireless charger 220 may be used to wirelessly provide charging power to the mobile device 100. As will further be appreciated by those skilled in the art, there are many different approaches to the provision of hardwire and wireless charging power. For example, the wireless charger 220 may wirelessly provide charging power using a magnetic induction method, a magnetic resonance method, an electromagnetic induction method, a non-radiative wireless electricity (WiTricity) method, etc.

In certain embodiments of the inventive concept, one or more configurations enabling the connection of the mobile device 100 to an external power source using (e.g.) using the travel adaptor 210 are provided. Thus, when the mobile device 100 is hardwire connected to 110/220 AC electrical line, the travel adaptor 210 may be used to convert the alternating current (AC) power provide by the electrical line into a direct current (DC) power signal compatible with the receptacle interface 140, the charging IC 110 and/or the battery 130 of the mobile device 100. Alternately, the when the mobile device 100 is hardwire connected to a host DC power source (e.g., a computer power supply), the travel adaptor 210 may be used to convert the host DC power into the DC power signal compatible with the receptacle interface 140, the charging IC 110 and/or the battery 130 of the mobile device 100.

According to these exemplary approaches among others, the travel adaptor 210 may support a "direct charging" of the battery 130 (e.g., a hardwire power connection together with voltage, current and/or waveform conversion(s) as required between the external power source and a power signal internally compatible with mobile device components). As will be described in some additional detail hereafter with reference to FIG. 2, an application processor 121 or a direct charger 113 may be used to recognize whether the travel adaptor 210 supports direct charging by (e.g.) monitoring a resistance value for a particular pin (e.g., CC pin 141).

Figure 2:
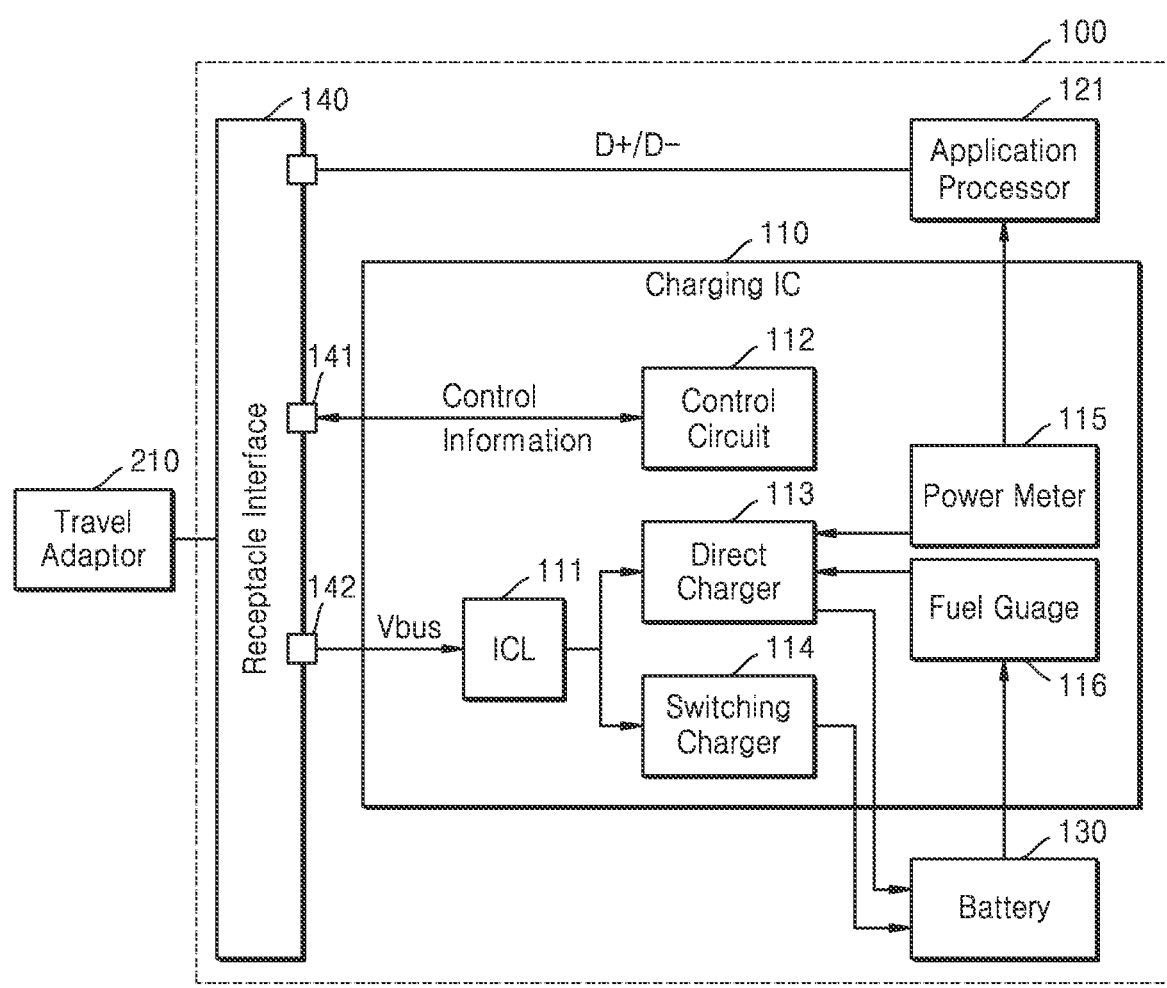
FIG. 2 is a block diagram further illustrating the charging IC 110 of FIG. 1.

FIG. 2 is a block diagram further illustrating in one example the mobile device 100, and in particular the charging IC 110 of the mobile device 100 according to an embodiment of the inventive concept.

Here, a threshold use of the travel adaptor 210 is assumed, but use of the wireless charger 220 might be just as easily assumed. In addition, only the application processor 121 is specifically illustrated as an example of the variable system load 120 described above in relation to FIG. 1.

In the illustrated embodiment of FIG. 2, the charging IC 110 may include a control circuit 112, a direct charger 113, a switching charger 114, an interrupt control logic (ICL) 111, a fuel gauge 116, and a power meter 115.

The ICL 111 may be used to control the magnitude (or level) of one or more input current(s) and/or one or more input voltage(s) (hereafter referred to in any combination as, "input voltage/current"). Here, for example, it is assumed that an input voltage/current provided at a power pin 142 of the receptable interface 140 is connected via a bus (Vbus) through the ICL 111 to the direct charger 113 and the switching charger 114.

When the system load 120 demands relatively high levels of power during a time when the battery 130 is being charged, the level of the input voltage/current provided to the charging IC 110 must be sufficient to meet the power demands of both the system load 120 and the charging of the battery 130. However, if the level of the input voltage/current rises too much, there is a danger of overloading the charging IC 110, and in extreme cases even starting a fire or causing an explosion. Accordingly, the ICL 111 may be used to control the level of the input voltage/current such that it never exceeds a defined safety threshold.

In certain embodiments of the inventive concept, the ICL 111 may include an internal transistor resistor. Assuming this particular configuration, should the level of the input voltage/current exceed the safety threshold, the resistance of the internal transistor resistor may be adjusted in response to a control signal (e.g., a part of the control information provided by the control circuit 112). Thus, assuming that the voltage level of the external power signal provided by the external power unit 200 remains constant, the input voltage/current level may be safely controlled by adjusting the resistance of the internal transistor resistor of the ICL 111.

The control circuit 112 may be used to control the overall operation of the charging IC 110. Here, the control circuit 112 may control communication between the charging IC 110 and he the travel adaptor 210. In this manner, the control circuit 112 may communicate various control information to the travel adaptor 210 that may be used to define the characteristics (e.g., level, waveform, timing, etc.) of the external power signal provided by the travel adaptor 210.

In certain embodiments of the inventive concept, the control circuit 112 may be used to identify a connection (or non-connection) between the travel adaptor 210 and the mobile device 100. The control circuit 112 may also be used to identify the operating characteristics of the travel adaptor 210. Such identification of the travel adaptor 210 connection and/or operation may be performed by monitoring one or more pins of the receptacle interface 140 (e.g., CC pin 141).

In certain embodiments of the inventive concept, the switching charger 114 may include a buck converter 320 which may be used to step-down (or step-up) the level of the input voltage/current. The buck converter 320 may also be used to control a period (or cycle) of a charging current applied to the battery 130.

In certain embodiments of the inventive concept, the switching charger 114 may include an inductor, and may not remove (or prevent) a switching loss and/or conduction loss due to a resistive component of the inductor. Accordingly, a charging efficiency of the switching charger 114 may be less than a charging efficiency of the direct charger 113.

The direct charger 113 may be used to directly provide an input voltage/current to the battery 130 via a cap divider 310. (See, e.g., FIG. 3A). The direct charger 113 may include a transistor and a capacitor, and may reduce the switching loss and/or conduction loss due to the resistive component of the conductor. The direct charger 113 may directly provide the input voltage/current to a node (or terminal) of the battery 130 through the cap divider 310, and thus, the direct charger 113 may be suitable for a high-efficiency charging of the battery 130. For example, charging of the battery 130 with the switching charger 114 may have an efficiency of about 90%, whereas charging of the battery 130 with the direct charger 113 may have an efficiency ranging from about 96% to about 98%.

The fuel gauge 116 may be used to sense the power state (or charge state) of the battery 130. For example, the fuel gauge 116 may sense a state of charge (SoC) for the battery 130 in accordance with a charging voltage, a charging current, and/or a battery temperature, etc. The SoC may be expressed as a ratio of a current capacity with respect to a maximum capacity of the battery 130, and may be defined in percentage (%) units.

In certain embodiments of the inventive concept, the fuel gauge 116 may include an analog-to-digital (ADC) converter, such that the fuel gauge 116 may digitally convert analog signal level(s) (e.g., sensed voltage, sensed current, and/or sensed temperature) into corresponding digital values and provide the digital values to the direct charger 113 and/or the application processor 121. The fuel gauge 116 may be implemented using an integrated circuit chip (or portion thereof) mounted on a PCB. However, the inventive concept is not limited thereto, and the fuel gauge 116 and the charging IC 110 may respectively include different integrated circuits or integrated circuit chips.

The power meter 115 may be used to monitor information associated with the input voltage/current. For example, the power meter 115 may be used to sense (or measure) the level of the input voltage/current applied to the charging IC 110. Alternately or additionally, the power meter 115 may be used to sense (or measure) the level of an output voltage/current provided to the system load 120.

An ADC associated with the power meter 115 may be used to convert analog information regarding the sensed input voltage/current and/or output voltage/current into corresponding digital values and provide the resulting digital values to the application processor 121 and/or the direct charger 113. The power meter 115 may be implemented using an integrated circuit chip (or portion thereof) mounted on a PCB. However, the inventive concept is not limited thereto, and the power meter 115 and the charging IC 110 may respectively include different integrated circuits or integrated circuit chips.

Given the foregoing exemplary configuration, the charging IC 110 may perform mode switching between the direct charger 113 and the switching charger 114 in response to control information derived from the operation of the fuel gauge 116 and/or the power meter 115.

In order to be properly operated under certain power saving condition(s), the charging IC 110 may further include one or more circuit(s) supporting at least one of various functions, including an under-voltage lockout (UVLO) function, an over-current protection (OCP) function, an over-voltage protection (OVP) function, a soft-start function to reduce an in-rush current, a foldback current function, a hiccup mode function protecting from a short circuit, an over-temperature protection (OTP) function, etc.

In the regards to the illustrated example of FIG. 2, it should be noted that the direct charger 113 and the switching charger 114 may in certain embodiments of the inventive concept be commonly fabricated (or implemented) in a semiconductor substrate.

Figure 3A:
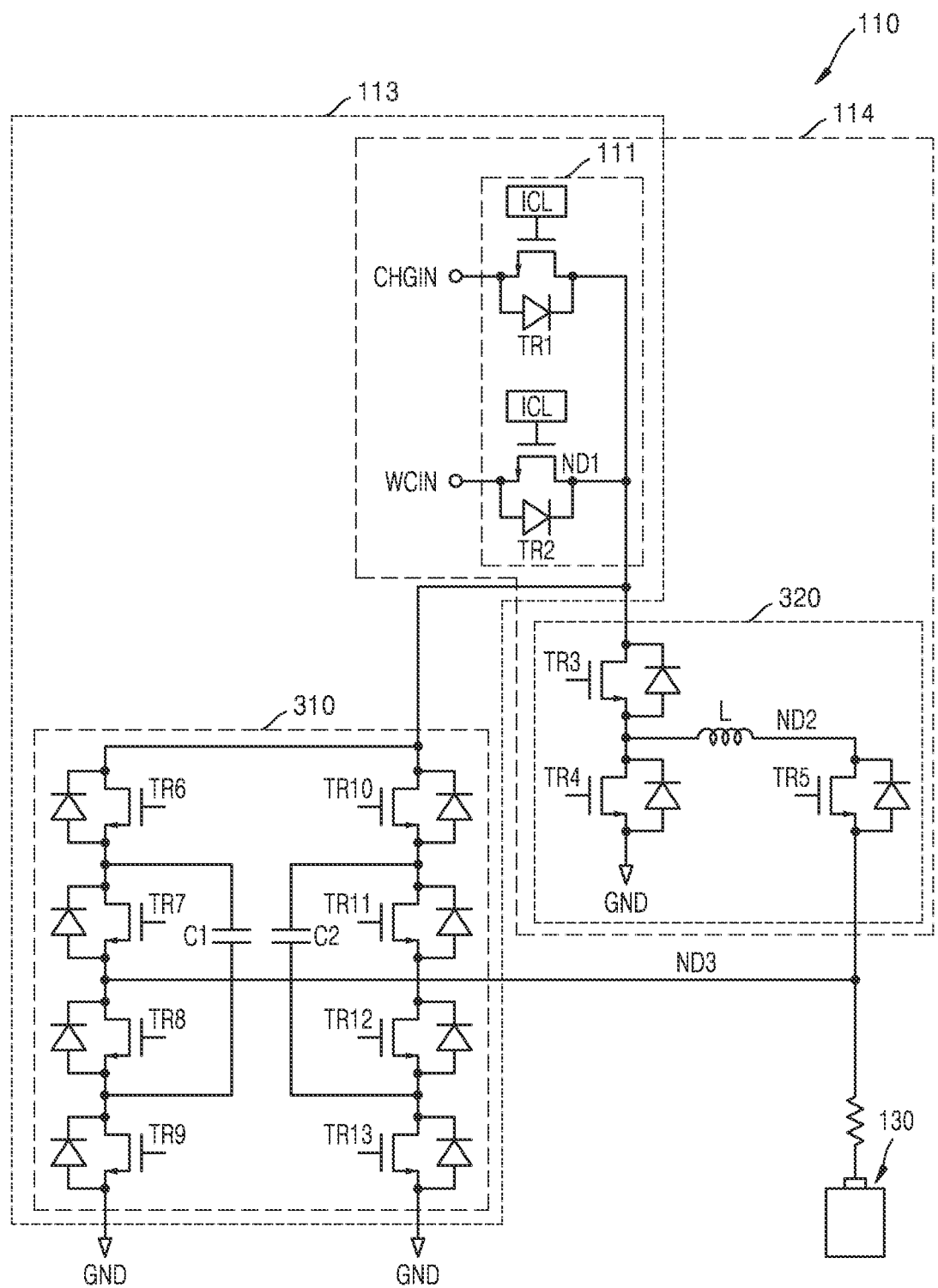
FIGS. 3A, 3B and 15 are respective circuit diagrams further illustrating examples of the charging IC of FIGS. 1 and 2.

FIG. 3A is a circuit diagram further illustrating in one example the charging IC 110 of FIGS. 1 and 2 according to an embodiment of the inventive concept.

Referring to FIG. 3A, the switching charger 114, the direct charger 113, and the battery 130 are shown in some additional detail.

According to certain embodiments of the inventive concept, the switching charger 114 and the direct charger 113 may share an input power unit. Thus, referring to FIG. 3A, a first transistor TR1 may be connected between hardwire input power CHGIN and a first node ND1, where the input power CHGIN may correspond to the external power signal provided by the travel adaptor 210 of FIG. 1. A second transistor TR2 may be connected between a wireless input power WCIN and the first node ND1, where the wireless input power WCIN may correspond to the external power signal provided by the wireless charger 220 of FIG. 1.

The first node ND1 may be connected to the cap divider 310 via a sixth transistor TR6 and a tenth transistor TR10 and may be connected to the buck converter 320 via a third transistor TR3.

When the third transistor TR3 is turned OFF, the input power may be provided to the cap divider 310 and the battery 130 via the input power unit. That is, when disconnected from the buck converter 320, the charging IC 110 may operate as the direct charger 113.

When the sixth transistor TR6 and the tenth transistor TR10 are respectively turned OFF, the input power is provided to the buck converter 320 via the input power unit, and the input power may be provided to the battery 130 as the third transistor TR3 and the fourth transistor TR4 are alternately and repeatedly turned ON/OFF at a regular cycle. That is, when disconnected from the cap divider 310, the charging IC 110 may operate as the switching charger 114.

Alternately, when the fifth transistor TR5 is turned OFF, the input power is provided to the cap divider 310 and the buck converter 320 via the input power unit, and in this case, the cap divider 310 may charge the battery 130 and the buck converter 320 may provide system power of a first output node ND2.

The switching charger 114 may include the third transistor TR3 through a fifth transistor TR5 and an inductor L. For example, the third transistor TR3 through the fifth transistor TR5 may include power switches. However, the structure of the switching charger 114 is not limited thereto, and according to embodiments, the number of transistors and the number of inductors included in the switching charger 114 may be variously modified. The third transistor TR3 may be connected between the first node ND1 and a switching node LX and receive the input current through the first node ND1. The fourth transistor TR4 may be connected between the switching node LX and a ground node GND and provide a ground voltage to the switching node LX. The inductor L may be connected between the switching node LX and the first output node ND2. The fifth transistor TR5 may be connected between the first output node ND2 and a second output node ND3. The fifth transistor TR5 may receive a voltage from the inductor L via the first output node ND2 and provide the received voltage to the battery 130 via the second output node ND3. When the fifth transistor TR5 is turned ON, a charging current may be provided to the battery 130 via the second output node ND3. In addition, in an embodiment, when the fifth transistor TR5 is turned ON, a battery current from the battery 130 may be provided to the system load 120. The battery current may flow in an opposite direction of a direction in which the charging current flows.

The direct charger 113 may include a first capacitor C1, a second capacitor C2, and sixth through thirteenth transistors TR6 through TR13. The cap divider 310 may also be referred to as a current doubler or an inverting charge pump. Referring to FIG. 3A, in a charging process according to a direct charging method, switching operations of the sixth transistor TR6 through the thirteenth transistor TR13 in the first capacitor C1 and the second capacitor C2 may be controlled. For example, the second capacitor C2 may be discharged while the first capacitor C1 is being charged, and the second capacitor C2 may be charged while the first capacitor C1 is being discharged. Accordingly, an output node voltage VOUT provided to the battery 130 may maintain an approximately constant level. A value of the output node voltage VOUT may be half a voltage level of the first node ND1.

Figure 3B:
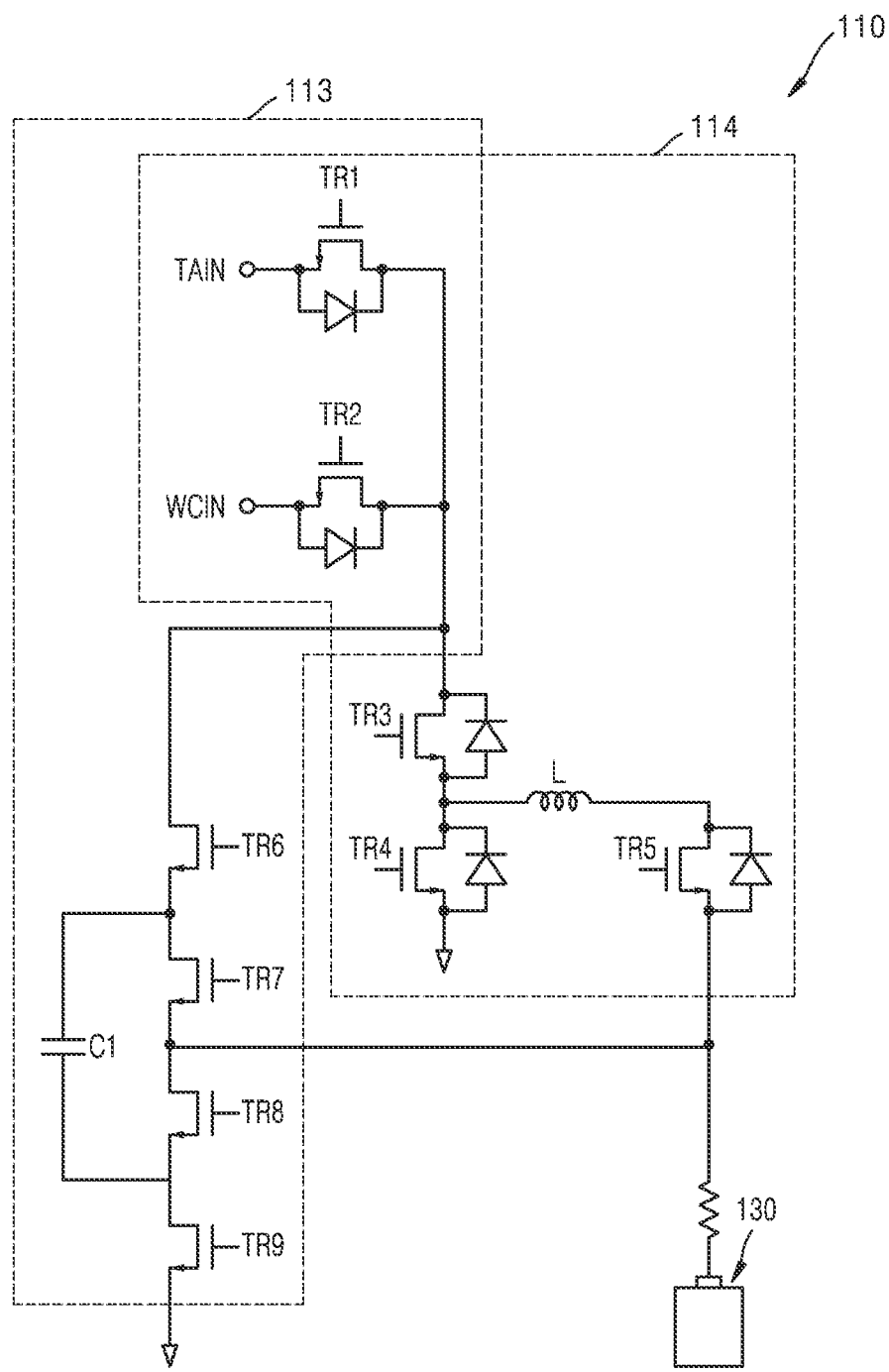

FIG. 3B is another circuit diagram further illustrating in another example the charging IC 110 of FIGS. 1 and 2 according to an embodiment of the inventive concept.

Referring to FIG. 3B, the charging IC 110 may again include the switching charger 114, the direct charger 113, and the battery 130. The charging IC 110 shown in FIG. 3B may correspond to a modified version of the charging IC 110 of FIG. 3A. Compared to the charging IC 110 of FIG. 3A, the charging IC 110 of FIG. 3B does not necessarily include the second capacitor C2 and the tenth transistor TR10 through the thirteenth transistor TR13.

Referring to FIG. 3B, while the sixth transistor TR6 and an eighth transistor TR8 are turned ON, a seventh transistor TR7 and a ninth transistor TR9 may be turned OFF, and the first capacitor C1 may be charged in a corresponding section. In addition, while the sixth transistor TR6 and the eighth transistor TR8 are turned OFF, the seventh transistor TR7 and the ninth transistor TR9 may be turned ON, and the first capacitor C1 may be discharged in a corresponding section. Operations in the corresponding sections may be repeatedly performed, a voltage level of the second output node ND3 repeatedly increases and drops in a certain range, and a voltage of the second output node ND3 may be provided to the battery 130.

Referring to FIGS. 3A and 3B, the cap divider 310 is shown as including the described plurality of transistors and at least one capacitor, but the cap divider 310 is not limited thereto. According to certain embodiments of the inventive concept, the cap divider 310 may also include a single transistor. However, when the cap divider 310 includes a single transistor, a voltage value of the first node ND1 may be directly transmitted as a voltage value of the second output node ND3. Accordingly, as a voltage apparent at the second node ND3 fluctuates as much as a change in a voltage apparent at the second output node ND3, it may be difficult to satisfy a condition of maintaining a constant voltage level in a constant voltage section.

Figure 4A:
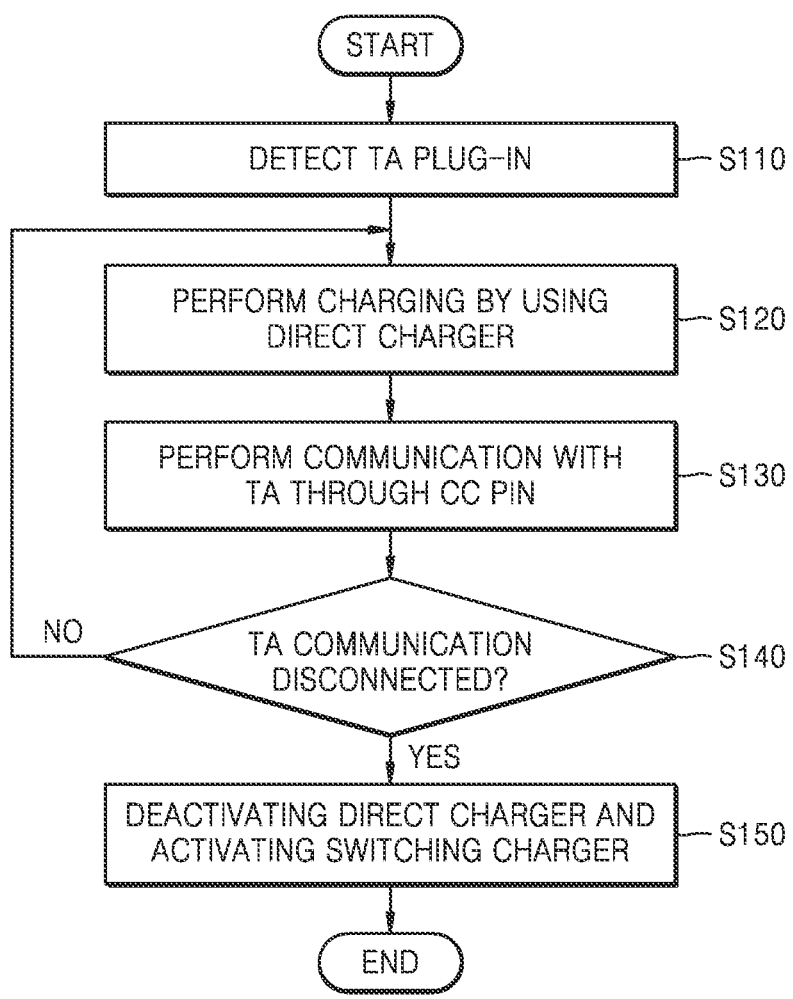
FIGS. 4A, 6, 8, 10, 11 and 13 are respective flowcharts summarizing in various aspects operating methods for a charging IC according to embodiments of the inventive concept.

FIG. 4A is a flowchart summarizing in one example an operating method for the charging IC 110 according to an embodiment of the inventive concept.

Referring to FIGS. 1, 2 and 4A, the operating method begins with the charging IC 110 detecting the connection of the travel adaptor (TA) 210 (S110). The detection may be made in response to (e.g.) a mechanical plug-in connection of the travel adaptor 210 to the receptacle interface 140. That is, when the travel adaptor 210 is mechanically connected to the mobile device 100 via a hardwire connection (e.g., a cable connection), the charging IC 110 may identify the connection by monitoring a particular connection pin (e.g., CC pin 141) associated with the receptacle interface 140.

The charging IC 110 may perform charging by using the direct charger 113 (S120). In this regard, the charging IC 110 may communicate, as required, with the travel adaptor 210 via one or more connection pins (S130), such that the travel adapter 210 communicates (i.e., receives and/or transmits) control information via the one or more connection pins.

Alternately, the wireless charger 220 may be used to generate and provide the external power signal to the mobile device 100. Regardless of the manner in which the external power signal is generated, however, the control information exchanged between the external power unit 200 and the mobile device 100 may include not only connection information, but also power level information that may be used to control the characteristics of an input voltage/current and/or an output voltage/current.

In this manner, while direct charging of the battery 130 is being performed, the application processor 121 may receive control information associated with the temperature of the battery 130, the remaining charge of the battery 130, a charging current and/or charging voltage sensed by the fuel gauge 116, etc. Accordingly, when it is determined that the temperature of the battery 130 is too high, for example, the application processor 121 may communicate relevant control information to the external power unit 200 to properly control (e.g., decrease the level of) the external power signal provided to the mobile device 100.

Returning to flowchart of FIG. 4A and assuming use of the travel adaptor 210, the charging IC 110 may determine whether or not the travel adapter 210 has been disconnected (S140) as one example of a mechanical disconnection between the external power unit 200 and the mobile device 100. For example, the charging IC 110 may periodically transmit a request signal REQ to determine whether or not communication with the travel adaptor 210 is still possible. When the request signal REQ is received, the travel adaptor 210 may operate to respond to the charging IC 110 with an acknowledgment signal ACK, such that the charging IC 110 may identify a continuing (or not) communications connection with the travel adapter 210. Accordingly, when the charging IC 110 does not receive the acknowledgement signal ACK after a predefined time period following the request signal REQ, the charging IC 110 may identify that the travel adapter 210 has been disconnected (S140=YES).

Upon determining that the travel adapter 210 has been disconnected (S140=YES), the charging IC 110 may deactivate the direct charger 113 and instead activate the switching charger 114 (S150).

If the travel adaptor 210 continuously provides the external power signal to the mobile device 100, it is possible that an overvoltage and/or overcurrent condition may occur possibly resulting in a battery fire or explosion, or a malfunction in the mobile device 100. Therefore, the charging IC 110 may deactivate the direct charger 113—which directly applies charging power to the battery 130 through the second output node ND3—to prevent the possibility of an overvoltage condition. And instead, the charging IC 110 may charge the battery 130 by activating the switching charger 114.

Figure 4B:
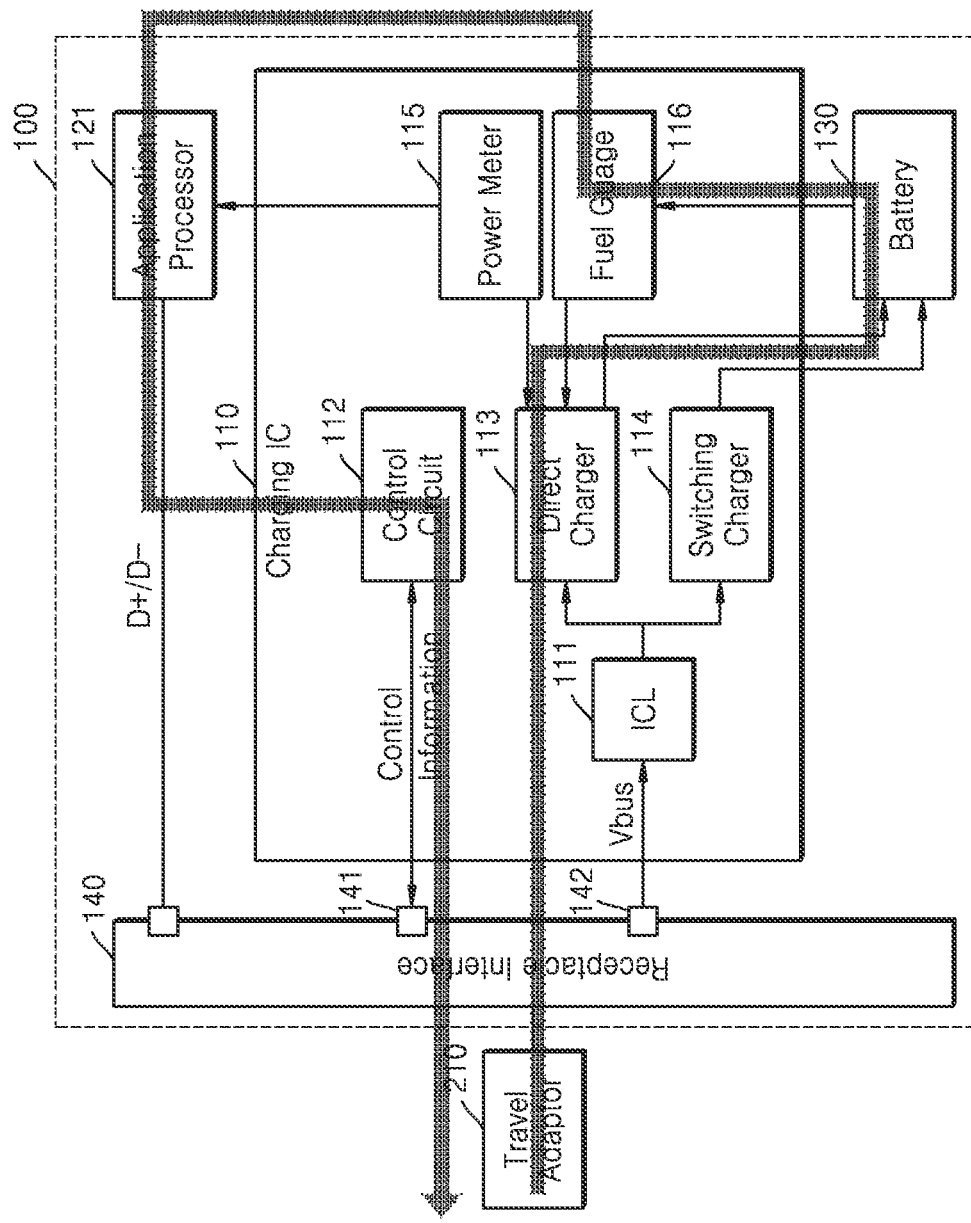
FIG. 4B is a block diagram illustrating a closed loop formed by the charging IC according to an embodiment of the inventive concept together with an external power unit and an application processor.

FIG. 4B is another block diagram, like the block diagram of FIG. 2, further illustrating a closed loop formed by the charging IC 110, the external power unit 200 and the application processor 121 according to an embodiment of the inventive concept.

Referring to FIG. 4B, the closed loop formed when the travel adapter 210 is connected to and communicates with the mobile device 100 in the feedback structure. That is, the travel adaptor 210 may provide the external power signal (e.g., an input voltage/current) consistent with the power demands of the mobile device 100. The external power signal provided by the travel adaptor 210 through the receptacle interface 140 may be applied to the direct charger 113 via the ICL 111. In this manner, the cap divider 310 of the direct charger 113 may be used to charge the battery 130 with a charging power (e.g., a charging power associated with one-half of the level of the external power signal provided by the travel adapter 210).

Within this configuration, the fuel gauge 116 may be used to sense the state of charge for the battery 130 and transmit corresponding control information to the application processor 121.

When it is determined that the system load 120 demands an increased power signal, the application processor 121 may request that the travel adaptor 210 provide the external power signal with an increased level. That is, a closed-loop feedback structure may be formed in order to control the output of the travel adaptor 210 using the receptacle interface 140, the direct charger 113, the battery 130, the fuel gauge 116, the application processor 121, and the travel adaptor 210. And this closed-loop feedback structure may be used to prevent over-charging of the battery 130 together with the attendant risks of fire and explosion.

According to certain embodiments of the inventive concept, when the travel adapter 210 is disconnected, the application processor 121 may receive control information identifying a non-connection condition for the travel adaptor 210, and accordingly release the closed-loop feedback structure. However, as will be described in some additional detail with respect to FIGS. 6, 8, 10, and 13, even when the travel adapter 210 is disconnected and the application processor 121 is no longer controlled by control information associated with the travel adaptor 210, the travel adaptor 210 may nonetheless be used to independently control the external power signal and may independently operate to provide stable battery charging.

Figure 5:
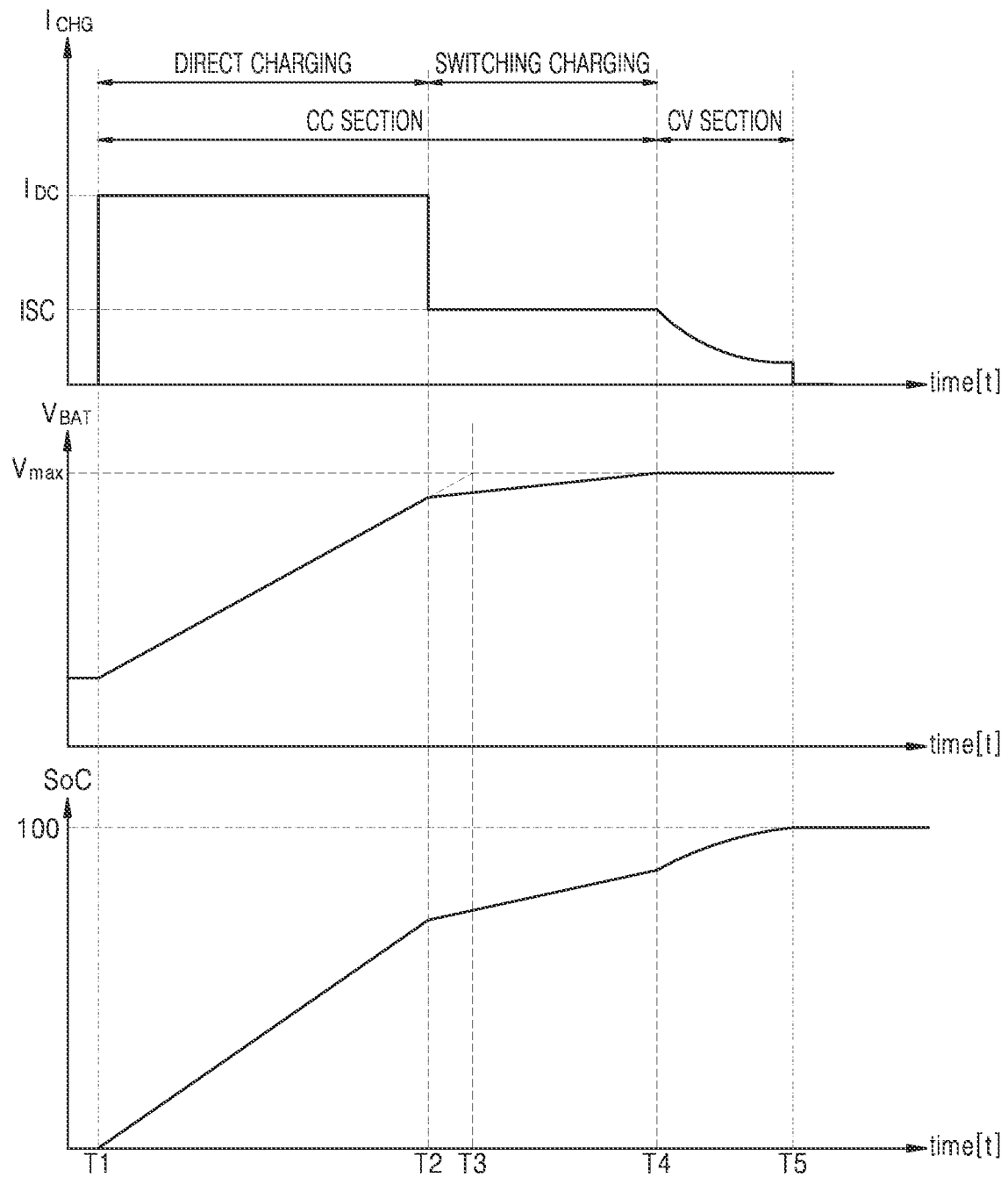
FIGS. 5, 7, 9, 12 and 14 are respective waveform diagrams illustrating certain relationships graph between a charging current, a battery voltage, and a state of charge for a battery consistent with various operating methods according to embodiments of the inventive concept.

FIG. 5 is a waveform diagram illustrating certain signal relationships according to an embodiment of the inventive concept. A charging current $I_{CHG}$, a battery voltage $V_{BAT}$, and a state of charging SoC are illustrated and may be understood as corresponding to the operating method described in relation to FIG. 4A.

Referring to FIGS. 1, 2, 3A, 4A and 5, the charging IC 110 may identify a connection between the travel adaptor 210 and the mobile device 10 at time T1. Between time T1 and time T2, the charging IC 110 may perform charging of the battery 130 using the direct charger 113. As the direct charger 113 directly applies a high voltage to the third node ND3 connected to the battery 130, the charging current $I_{CHG}$ may have a relatively high level. Thus, the time period between times T1 and T2 may be understood as a constant current (CC) section, wherein the battery 130 is charged by a current having a relatively high and constant level.

However, at time T2 it is assumed that the charging IC 110 identifies a disconnection of the travel adaptor 210. For example, the charging IC 110 may fail to receive an acknowledge signal ACK from the travel adaptor 210 in response to a communicated request signal REQ after a predetermined time. In order to prevent the battery voltage from being charged beyond a safety threshold (e.g., a defined maximum battery voltage Vmax), the charging IC 110 may deactivate the direct charger 113 and activate the switching charger 114.

Between time T2 and time T4, the charging IC 110 may perform charging of the battery 130 using the switching charger 114. Charging efficiency of the switching charger 114 is less than the charging efficiency of the direct charger 113, and thus, the battery voltage $V_{BAT}$ and the corresponding state of charging SoC rise relatively slowly between time T2 and time T4.

Time T3 corresponds to a time at which the battery voltage $V_{VAT}$ would have reached the maximum battery voltage Vmax if the travel adapter 210 had not been disconnected. Thus, the battery charging time may be extended from time T3 to time T4 once the travel adaptor 210 is disconnected, and the battery charging mode is switched from the direct charger 113 to the switching charger 114.

The period between time T4 and time T5 may be understood as a constant voltage (CV) section. That is, as the battery voltage $V_{BAT}$ gradually reaches the maximum battery voltage Vmax at time T4, the charging IC 110 may continue to gently charge the battery 130 to maintain the maximum battery voltage Vmax. Thus, during the CV section, the battery 130 may be charged to have a constant level equal to the maximum battery voltage Vmax, and thus, the charging current $I_{GHC}$ may rapidly decrease, and the state of charge SoC may remain saturated at a 100% level.

Figure 6:
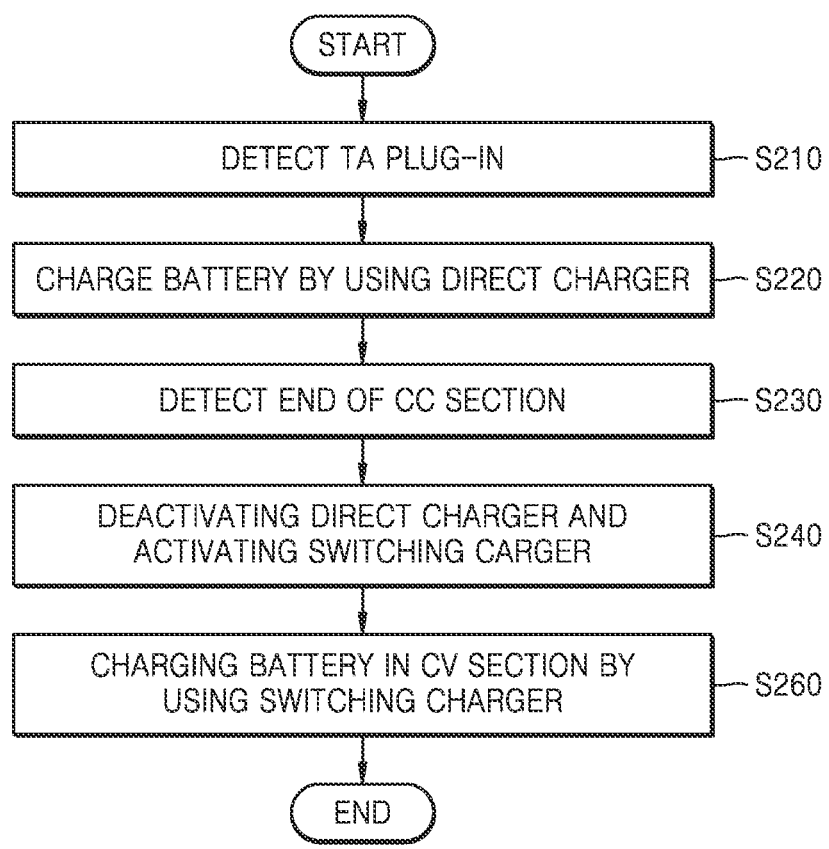

FIG. 6 is a flowchart summarizing in another example an operating method for the charging IC 110 according to an embodiment of the inventive concept.

Referring to FIG. 6, the charging IC 110 may detect a plug-in of the travel adaptor 210 (S210) as one example of a mechanical connection between the external power unit 200 and the mobile device 100. The charging IC 110 may perform charging by using the direct charger 113 (S220). Here, steps S210 and S220 correspond respectively to steps S110 and S120 described in relation to FIG. 4A.

The charging IC 110 may detect an end to a constant current (CC) section of the battery charging process (S230), where the CC section corresponds to a period of time during which the battery 130 is charged with a charging current having a constant level. Here, the end of the CC section may occur when the battery voltage $V_{BAT}$ reaches the maximum battery voltage Vmax. That is, the fuel gauge 116 may periodically perform sensing with respect to the battery 130 to monitor the level of the battery voltage $V_{BAT}$ and provide corresponding control information regarding the battery voltage $V_{BAT}$ to the direct charger 113.

More particularly, the direct charger 113 may include a direct charger intellectual property (IP), where the direct charger IP is a circuit implemented at a logic gate level and may be embedded in the charging IC 110 prior to performing the battery charging process according to embodiments of the inventive concept. Hereinafter, description related to providing control information to the direct charger 113 or making a determination in relation to the direct charger 113 may be understood as providing control information or making a determination in relation to the IP of the direct charger 113.

Once the end of the CC section has been detected (S240), the charging IC 110 may deactivate the direct charger 113 and activate the switching charger 114 (S250). That is, when the level of the battery voltage $V_{BAT}$, as sensed by the fuel gauge 116, reaches a level of the maximum battery voltage, the direct charger 113 may turn OFF the sixth transistor TR6 and the tenth transistor TR10 in order to activate the switching charger 114.

In this regard, the charging IC 110 may continue to perform charging of the battery 130 during a constant voltage (CV) section of the charging process using the switching charger 114. By deactivating the direct charger 113—which directly applies charging power one or more nodes (or terminals) of the battery 130, the charging IC 110 may instead perform charging using the switching charger 114, such that the battery voltage may be controlled to stably maintain at or approximate to the level of the maximum voltage value in the CV section.

Figure 7:
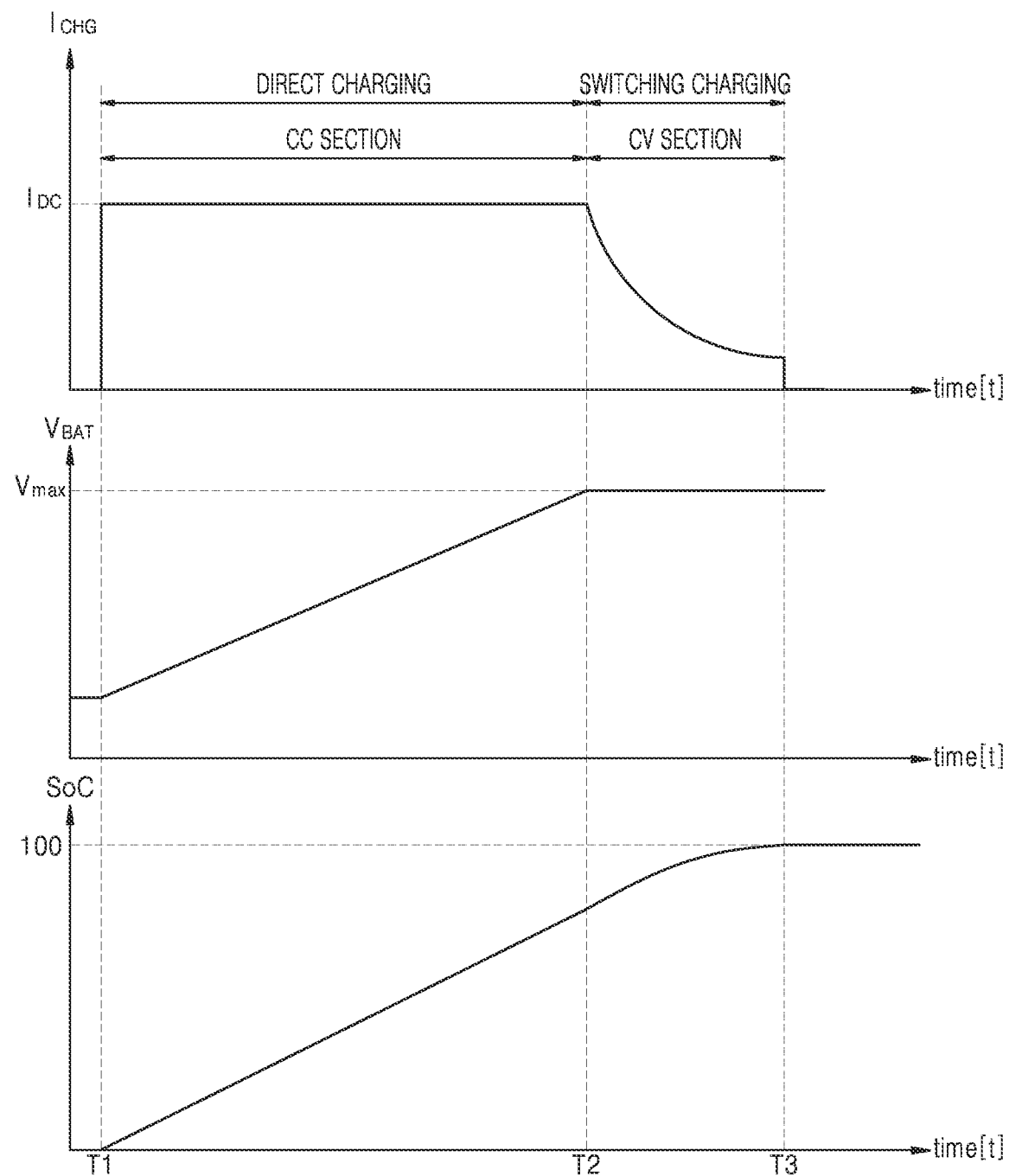

FIG. 7 is a waveform diagram further illustrating certain signal relationships according to an embodiment of the inventive concept. Here, the charging current $I_{CHG}$, the level of the battery voltage $V_{BAT}$, and the state of charge SoC are shown in relation to the operating method of FIG. 6.

Referring to FIG. 7, the time period between time T1 and time T2 may be understood as a constant charge (CC) period, wherein the charging IC 110, upon identifying a connection with the travel adaptor 210, performs charging of the battery 130 using the direct charger 113. As the direct charger 113 may directly apply voltage having a relatively high level to the third node ND3 connected to the battery 130, the charging current $I_{CHG}$ may have a relatively high level. Thus, during the CC section of the battery charging process between time T1 and time T2, the charging IC may control the charging of the battery 130 to apply and maintain a charging current having a constant level. Hence, the charging of the battery voltage $V_{BAT}$ may have a constant, positive slope.

At time T2, it is assumed that the charging IC 110 identifies that the level of the battery voltage $V_{BAT}$ has reached the maximum battery voltage Vmax. In other words, the fuel gauge 116 may be used to sense the level of the battery voltage $V_{BAT}$ and provide corresponding control information regarding the level of the battery voltage $V_{BAT}$ to the direct charger 113. The direct charger 113 may then be deactivate at time T2. As the level of the battery voltage $V_{BAT}$ reaches the maximum battery voltage Vmax, the battery voltage $V_{BAT}$ may nonetheless be stably and constantly maintained by activating the switching charger 114.

During the time period (i.e., a constant voltage (CV) section of the battery charging process) between time T2 and time T3, the charging IC 110 may perform charging of the battery 130 using the switching charger 114. While the battery voltage $V_{BAT}$ is being maintained, the level of the charging current applied to the battery 130 may rapidly decrease. In addition, referring to the state of charge SoC, as the level of the charging current decreases, the slope at which the state of charge SoC increases also decreases over time.

Figure 8:
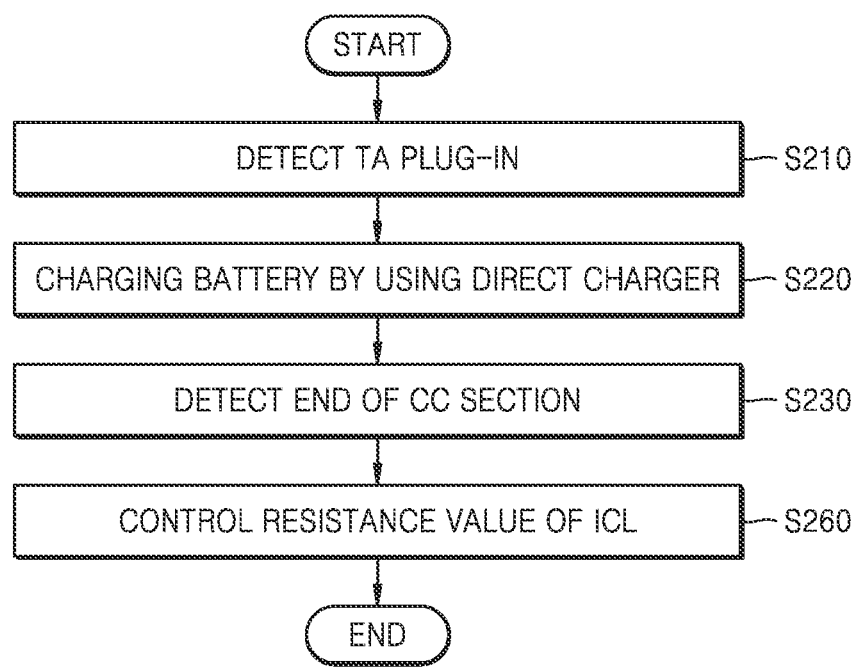
Figure 9:
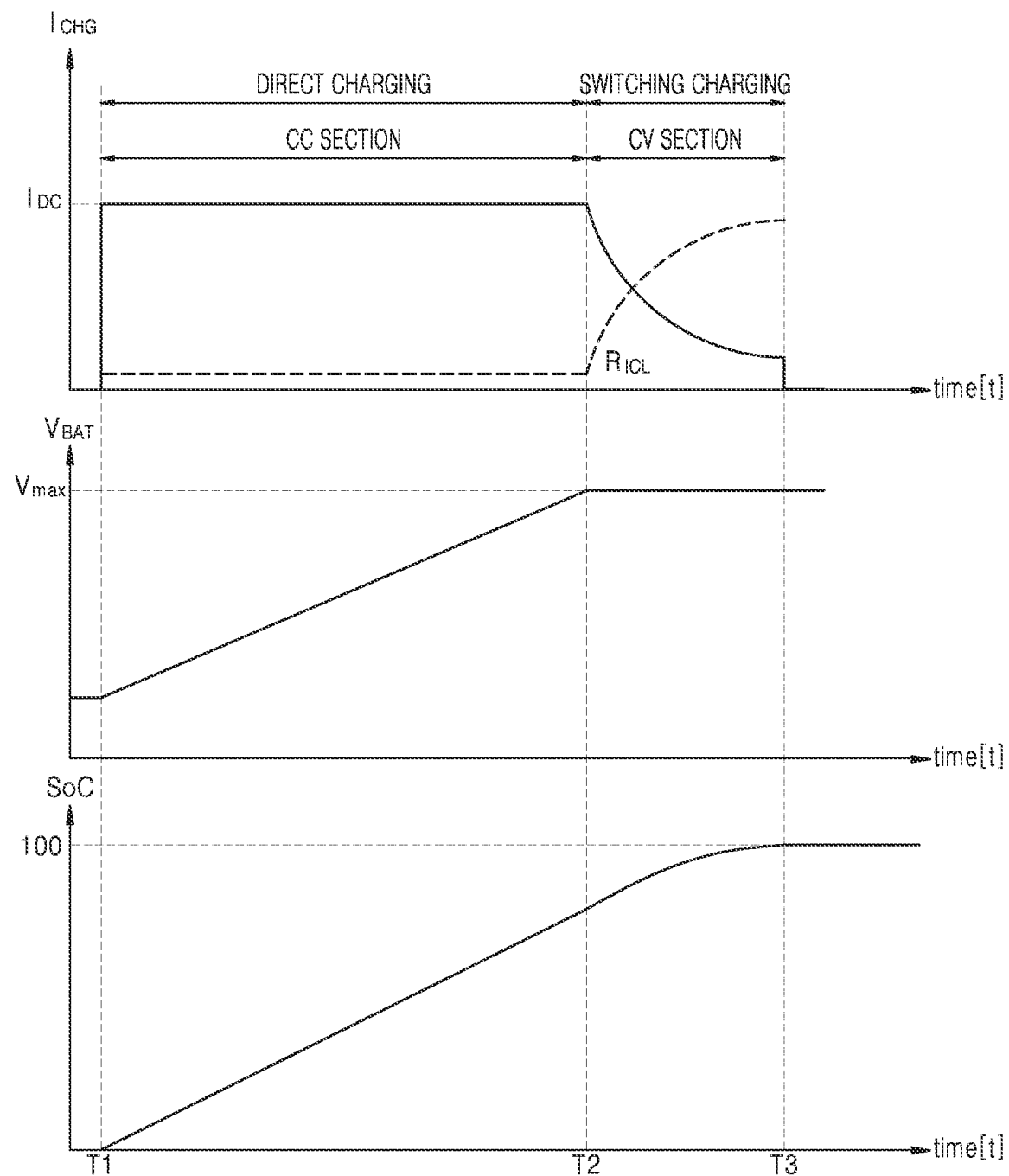

FIG. 8 is a flowchart summarizing in yet another example an operating method for the charging integrated circuit according to an embodiment of the inventive concept. FIG. 9 is another waveform diagram illustrating relationships between signals during a battery charging process corresponding to the operating method of FIG. 8.

Referring to FIG. 8, method steps S210, S220 and S230 have previously been described with reference to FIG. 6.

However, following the detection of the end of the CC section of the battery charging process, the charging IC 110 may be used to control a resistance of the ICL 111 (S260). That is, instead of deactivating the direct charger 113 and activating the switching charger 114 at the end of the CC section, the charging IC may continue to charge the battery 130 using the direct charger 113, but also control the resistance of the ICL 111 to maintain a constant voltage level during the CV section of the battery charging process. This approach recognizes the lesser charging efficiency of the switching charger.

For example, the charging IC 110 may increase the resistance of the ICL 111 proportional with an amount of decrease in the charging current $I_{CHG}$ during the CV section. Referring to FIG. 9, if the resistance of the ICL 111 increases in proportion with an amount of increase in the charging current $I_{CHG}$, a constantly maintain battery voltage $V_{BAT}$ level may be provided across the CV section. Accordingly, charging of the battery 130 using the direct charger 113 may be performed until the battery 130 is completely charged. However, when the resistance value of the ICL increases, the level of power transmission loss due to the resistance of the ICL 11 may also increase.

Figure 10:
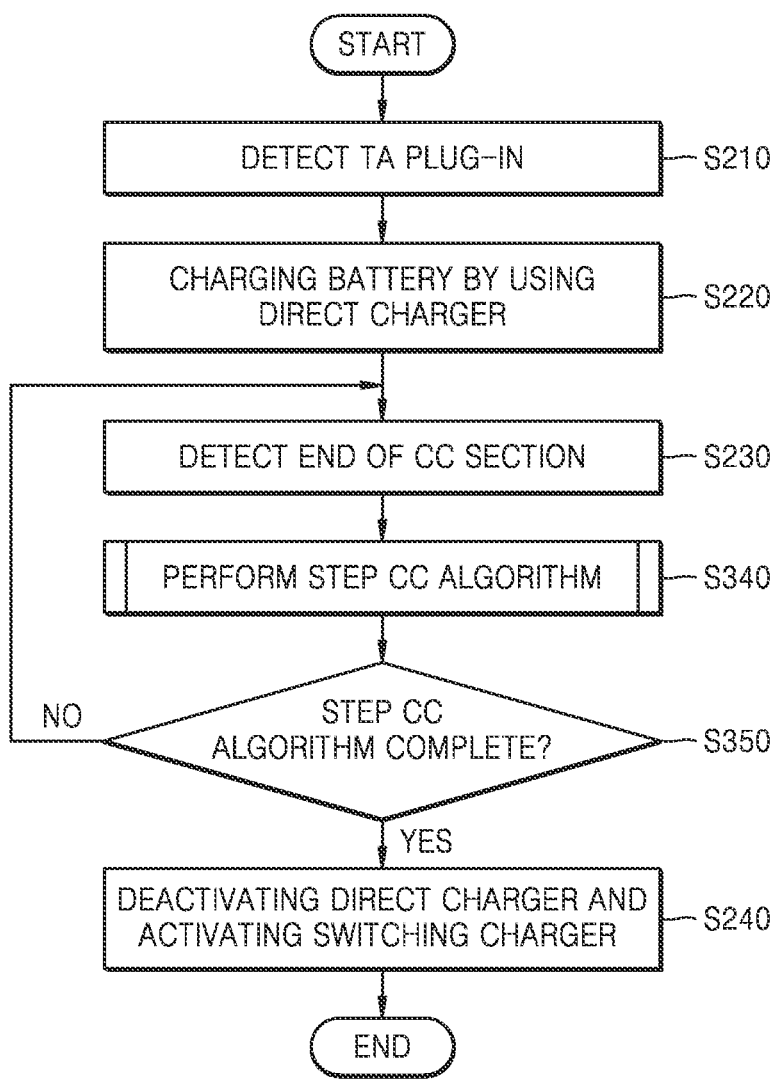

FIG. 10 is another flowchart summarizing in yet another example an operating method for the charging IC 110 according to an embodiment of the inventive concept.

Referring to FIG. 10, method steps S210, S220, S230 and S240 have previously been described with reference to FIG. 6.

Additionally, however, in the method of FIG. 10, the charging IC 110 performs a step CC algorithm after detecting the end of the CC section (S340). The step CC algorithm may be an algorithm that gradually decreases the level of the charging current while maintaining the above-described characteristics of the CC section. By maintaining charging time using the direct charger 113 to a greatest extent safely possible throughout the CC section, the time required for battery charging may be reduced and charging efficiency improved.

A determination may be made as to whether or not the performing of the step CC algorithm is complete (S350). In one approach, the fuel gauge 116 may be used to provide control information associated with one or more of the level(s) of the battery voltage $V_{BAT}$ and the charging current $I_{CHG}$. The direct charger 113 may be used to monitor the level of the charging current $I_{CHG}$ as sensed by the fuel gauge 116. When the level of the charging current $I_{CHG}$ decreases to be less than or equal to a threshold current value, the direct charger 113 may determine that the performing of the step CC algorithm is complete (S350=YES).

Although the battery voltage $V_{BAT}$ may actually reach the maximum battery voltage Vmax, the section of the battery charging process having a high charging efficiency may be extended by continued use of the direct charger 113. However, when the charging current $I_{CHG}$ decreases below the threshold current value, the charging efficiency of the direct charger 113 in conjunction with the performing of the step CC algorithm becomes essentially the same as the charging efficiency of the switching charger 114. As will be described in some additional detail hereafter, the charging current $I_{CHG}$ may be reduced by increasing the resistance of the ICL 111. Conduction loss also occurs in proportion with the increased resistance of the ICL 111, and thus, charging efficiency decreases. Thus, a "threshold current value" may be understood as a current value at which a first charging efficiency provided by use of the direct charger 113 in conjunction with a decreased charging current $I_{CHG}$, and a second charging efficiency provided by use of the switching charger 114 are the same. In this regard, the threshold current value may be determined using well understood experimental methods. Alternatively, the threshold current value may be a current value calculated by using information provided by the power meter 115 and/or the fuel gauge 116.

Figure 11:
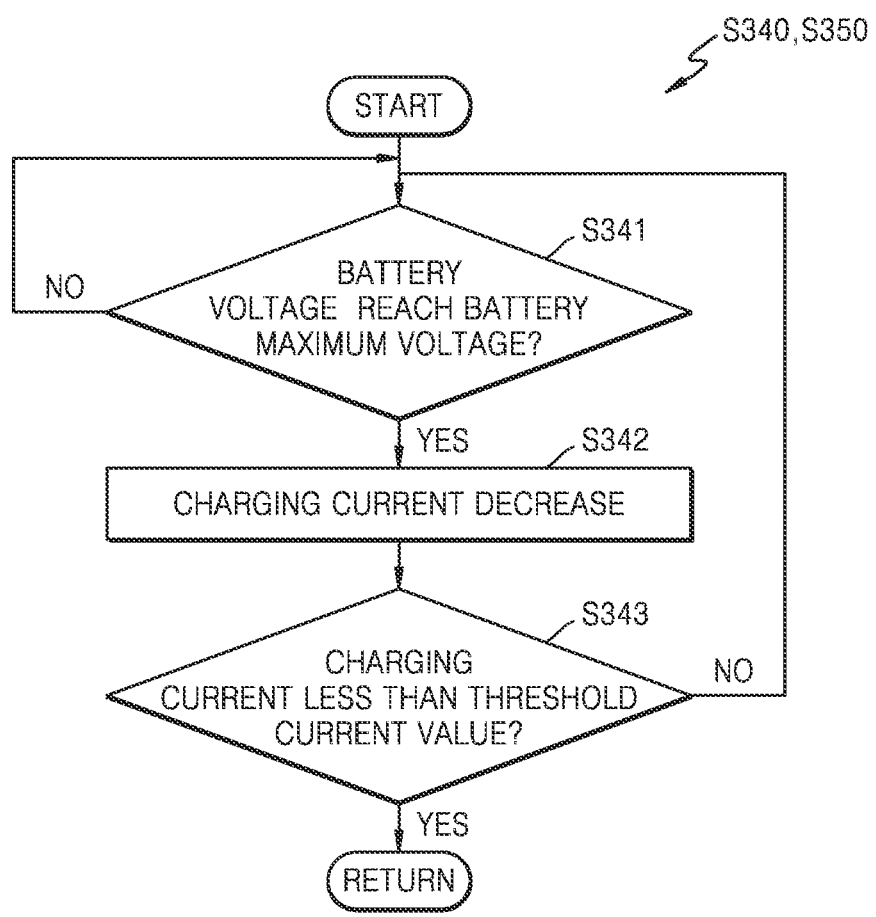

FIG. 11 is a flowchart further illustrating in one example the method steps of performing the step CC algorithm (S340) and determining whether or not the step CC algorithm is complete (S350) according to an embodiment of the inventive concept.

Referring to FIG. 11, the charging IC 110 may determine whether the battery voltage $V_{BAT}$ has reached the maximum battery voltage Vmax (S341). In this regard, the direct charger 113 may be used to monitor the battery voltage $V_{BAT}$ (e.g., periodically obtain sensing data associated with the battery 130, as provided by the fuel gauge 116. As noted above, the sensing data may include the level of the battery voltage $V_{BAT}$, the battery temperature, the state of charge SoC for the battery, etc. The direct charger 113 may also be used to determine whether the level of the battery voltage $V_{BAT}$ has reached the maximum battery voltage Vmax based on the obtained sensing data. In one example, the maximum battery voltage Vmax may be defined as 4.2 V.

So long as the level of the battery voltage $V_{BAT}$ remains less than the maximum battery voltage Vmax (S341=NO), the direct charger 113 may continue to perform monitoring of the battery voltage $V_{BAT}$. However, when the battery voltage $V_{BAT}$ reaches the maximum battery voltage Vmax, the direct charger 113 may decrease the charging current $I_{CGO}$ being applied to the battery 130 (S342).

In this regard, the direct charger 113 may transmit a control signal to the control circuit 112 to instruct decrease the magnitude of the external power signal provided by the external power unit 200. Upon receiving the control signal from the direct charger 113, the control circuit 112 may communicate appropriate control information to the external power unit 200 (e.g., the travel adaptor 210) via the one or more CC pins. The control information may include information that steps-down the external power signal, and as the external power signal decreases, the charging current $I_{CHG}$ applied to the battery 130 also decreases.

The charging IC 110 may then determine whether the charging current $I_{CHG}$ is less than the threshold current value (S343). As described above, the value of the charging current $I_{CHG}$ may be identified in response to sensing data associated with the battery 130, such as that provided by the fuel gauge 116. The threshold current value may be calculated in advance and correspond to a current value at which the first charging efficiency of the direct charger 113 and the second charging efficiency of the switching charger 114 are the same.

So long as the charging current $I_{CHG}$ remains greater than the threshold current value (S343=NO), the first charging efficiency of the direct charger 113 will be stepped-down (yet still remaining greater than the second charging efficiency of the switching charger 114) by cyclical repletion of the method steps (S341=YES), S342 and (S343=NO). However, when the charging current $I_{CHG}$ falls below the threshold current value (S343=YES), a determination may be made that the second charging efficient of the switching charger 114 is at least equal to the first charging efficiency of the direct charger 113. Accordingly, the direct charger 113 may be deactivated and the switching charger 114 may be activated (S240).

Figure 12:
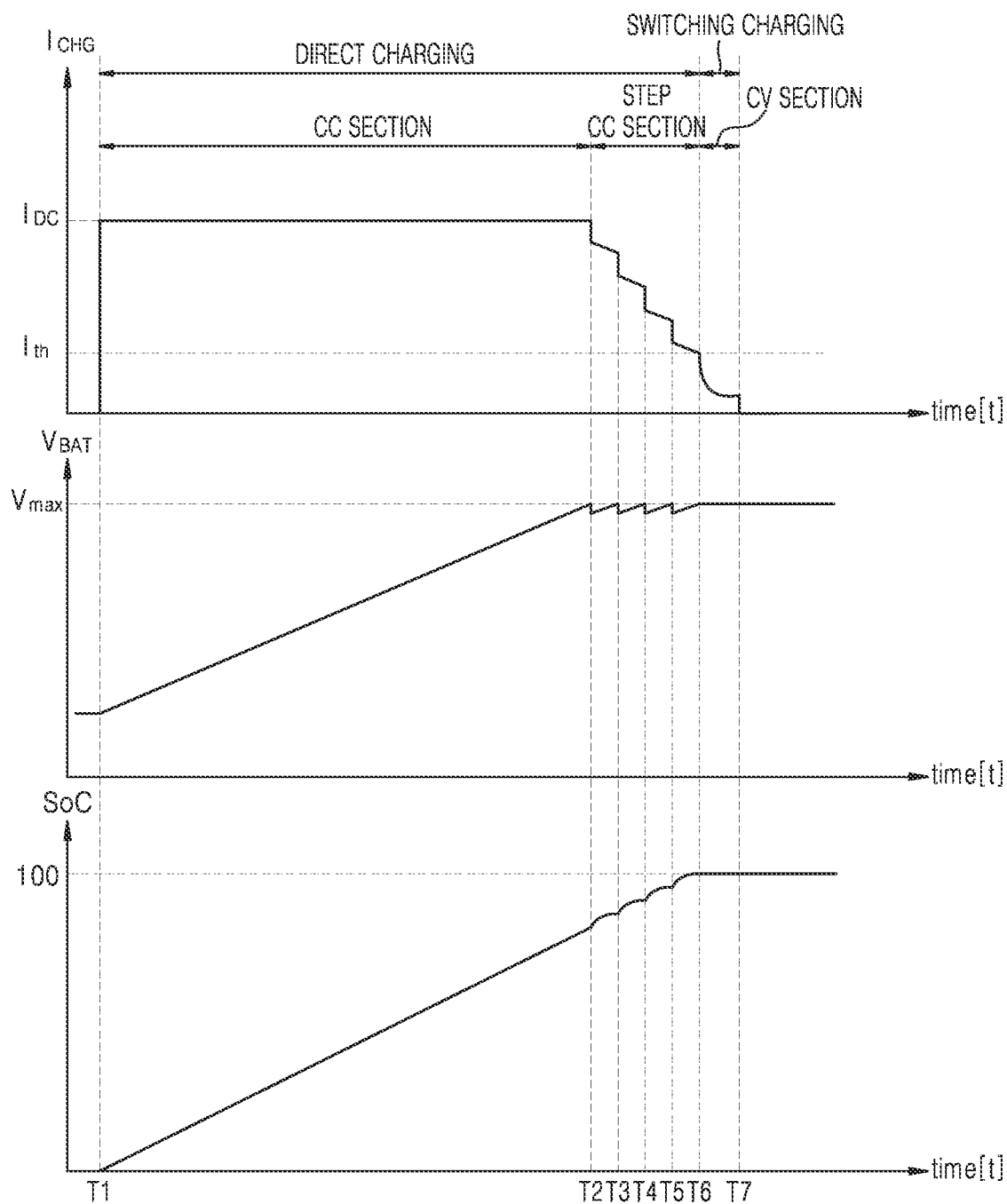

FIG. 12 is another waveform diagram illustrating relationships between signals during a battery charging process corresponding to the operating method of FIG. 8 according to an embodiment of the inventive concept.

Referring to FIG. 12, the charging IC 110 may perform charging using the direct charger 113 between time T1 and time T2 (a constant charge (CC) section of the battery charging process). In particular, the charging IC 110 may detect (e.g.) a hardwire connection between the external power unit 200 and the mobile device 100 at time T1. The direct charger 113 may be used to directly apply the external power signal provided by the travel adaptor 210 through the cap divider 310 to the third node ND3 connected to the battery 130. Under these conditions the level of the charging current $I_{CHG}$ may be relatively high.

However, during a sequence of stepped voltage reductions (e.g., T2 through T6) (collectively, a step CC section of the batter charging process) a charging voltage/current provided by the direct charger 113 may be step-wise reduced. Thus, it is assumed that at time T2 the battery voltage $V_{BAT}$ reaches the maximum battery voltage Vmax. Referring to FIG. 5, CV charging using the switching charger 114 may be performed until the battery voltage $V_{BAT}$ reaches the maximum battery voltage Vmax (time T4 of FIG. 5), and then the charging current $I_{CHO}$ rapidly decreases. On the other hand, in the step CC section, the charging IC 110 bypasses activating the switching charger 114 and performs CV charging using the direct charger 113, while step-wise decreasing the charging $I_{CHG}$ to decrease the charging $I_{CHG}$ to be similar to the decrease in charging current $I_{CHG}$ in FIG. 5.

At time T2, the charging IC 110 may identify that the battery voltage $V_{BAT}$ has reached the maximum battery voltage Vmax and decrease the level of the external power signal provided by the travel adaptor 210. For example, the direct charger 113 may obtain sensing data regarding the battery 130 from the fuel gauge 116 and transmit the control information instructing a decrease in the external power signal via the control circuit 112. As the external power signal passes through the cap divider 310 of the direct charger 113 and is passed at a half value to the third node ND3, the charging current $I_{CHG}$ may decrease at time T2. Here, the smaller the decrease in the level of the external power signal, the shorter the period during which the external power unit 200 steps down the external power signal. In this manner, the decrease in the external power signal will match the graph of the charging current $I_{CHG}$ in the CV section during charging using the switching charger 114. As the direct charger 113 directly provides a charging voltage to the battery 130 via the third node ND3, the external power signal provided by the travel adaptor 210, as stepped down at time T2 may have the desired effect on the battery voltage $V_{BAT}$. Referring to FIG. 10, it may understood that the battery voltage $V_{BAT}$ is also stepped down by a constant magnitude at time T2.

Between time T2 and time T3, as the charging current $I_{CHG}$ is applied, the battery voltage $V_{BAT}$ may increase. However, the amount of increase for the battery voltage $V_{BAT}$ is extremely small, and the level of the charging current $I_{CHG}$ may decrease to be similar to the level of the charging current $I_{CHG}$ in the CV section. In other words, referring to the state of charge SoC for the battery, it may be understood that despite that the battery voltage $V_{BAT}$ increasing during the time period between time T2 and time T3, the state of charge SoC increases gradually as in the CV section. The successive time periods—the time period from T3 to time T4, the time period from T4 to time T5, and the time period from T5 to time T6 may be similarly described.

According to the above-described embodiments, after the battery voltage $V_{BAT}$ reaches the maximum battery voltage Vmax and the CC section ends, the charging IC 110 may perform the step CC algorithm to increase high-efficiency charging time using the direct charger 113.

Figure 13:
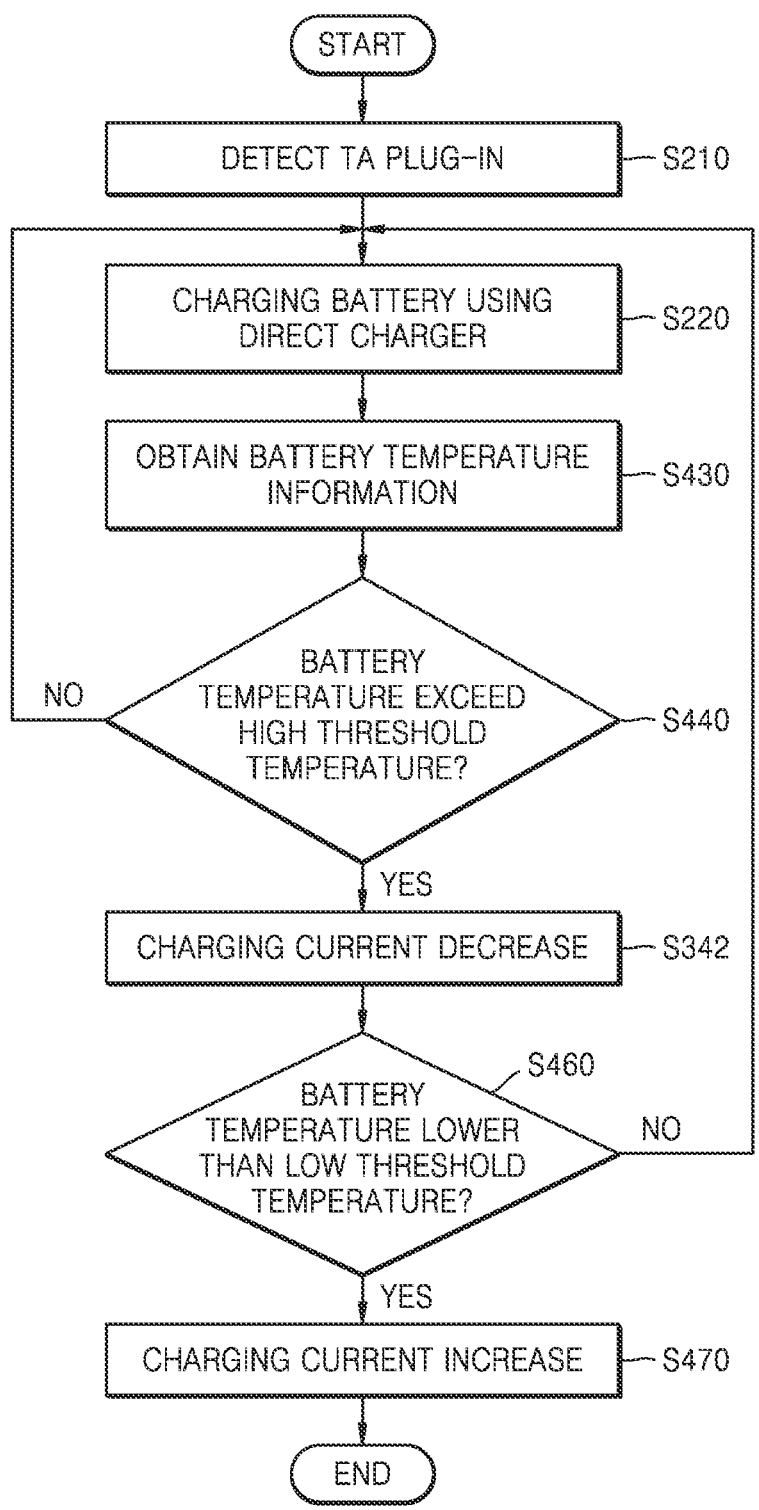

FIG. 13 is another flowchart summarizing in yet another example an operating method for the charging IC 110 according to an embodiment of the inventive concept.

Referring to FIG. 13, method steps S210, S220 and S342 have previously been described with reference to FIGS. 6, 10 and 11.

Referring to FIG. 13, after method steps S210 and S220, the charging IC 110 may obtain battery temperature information for the battery 130 (S430). The fuel gauge 116 may once again be used to accomplish this step. That is, the fuel gauge may periodically obtain sensing data associated with the battery 130. The sensing data may include the battery temperature, the SoC for the battery, and/or the level of the battery voltage $V_{BAT}$. In certain embodiments of the inventive concept, the fuel gauge 116 may provide the sensing data regarding the battery temperature to the direct charger 113.

Here, the term "battery temperature information" may include at least one of; a temperature of the battery, an internal temperature taken at a point within the charging IC 110 (e.g., the application processor 121 or the system load 120), an external temperature taken at a point outside of charging IC 110, an internal temperature taken at a point within the mobile device 100, etc. For example, the external temperature of the charging IC 110 and the internal temperature of the mobile device 100 may be used to measure, calculate or derive the battery temperature information.

Once the battery temperature information has been obtained, the charging IC 110 may determine whether the battery temperature exceeds the high threshold temperature (S440). For example, the direct charger 113 may compare the high threshold temperature with the battery temperature information using the fuel gauge 116. The high threshold temperature may be a preset temperature value, and may correspond to a temperature associated with errors in the operation of the charging IC 110 and/or the mobile device 100.

So long as the battery temperature remains less than the high threshold value (S440=NO), the direct charger 113 may be used to repeat method steps S210, S220 and S430. That is, until the battery temperature exceeds the high threshold temperature (S440=YES), the charging IC 110 may continuously perform charging using the direct charger 113. However, when the battery temperature exceeds the high threshold temperature, the direct charger 113 must take additional steps to reduce the battery temperature.

Hence, the charging IC 110 may decrease the charging current $I_{CHG}$ (S342), as previously described with reference to the embodiment of FIG. 11. When the charging current $I_{CHG}$ is reduced, switching loss or conduction loss is also reduced and the amount of a current converted into heat decreases by an amount equal to the reduced loss. In this manner the battery temperature may be reduced. As the direct charger 113 decreases the charging current $I_{CHG}$, the charging voltage applied to battery also decreases. Accordingly, the charging IC 110 may request a decrease in the level of the external power signal provided by the external power unit 200.

After decreasing the charging current, the charging IC 110 may determine whether the battery temperature is less than a low threshold temperature (S460). For example, the direct charger 1113 may compare the low threshold temperature with the battery temperature of the sensing data received from the fuel gauge 116. For example, when the battery 130 is a lithium ion polymer battery, the low threshold temperature may correspond to a temperature at which a transportation rate of electrolytes of the lithium ion polymer battery may decrease and cause malfunction of the battery 130. When the battery temperature is higher than the low threshold temperature, the direct charger 113 may determine that the direct charger 113 may be continuously used and perform method step S420 again. On the other hand, when the battery temperature is lower than or equal to the low threshold temperature, the direct charger 113 may perform method step S470 to increase the battery temperature.

In method step S470, the charging IC 110 may increase the charging current $I_{CHG}$. Because when the charging current $I_{CHG}$ is increased, the switching loss or conduction loss also increases, and the increased loss may be converted into heat and increase the battery temperature.

Figure 14:
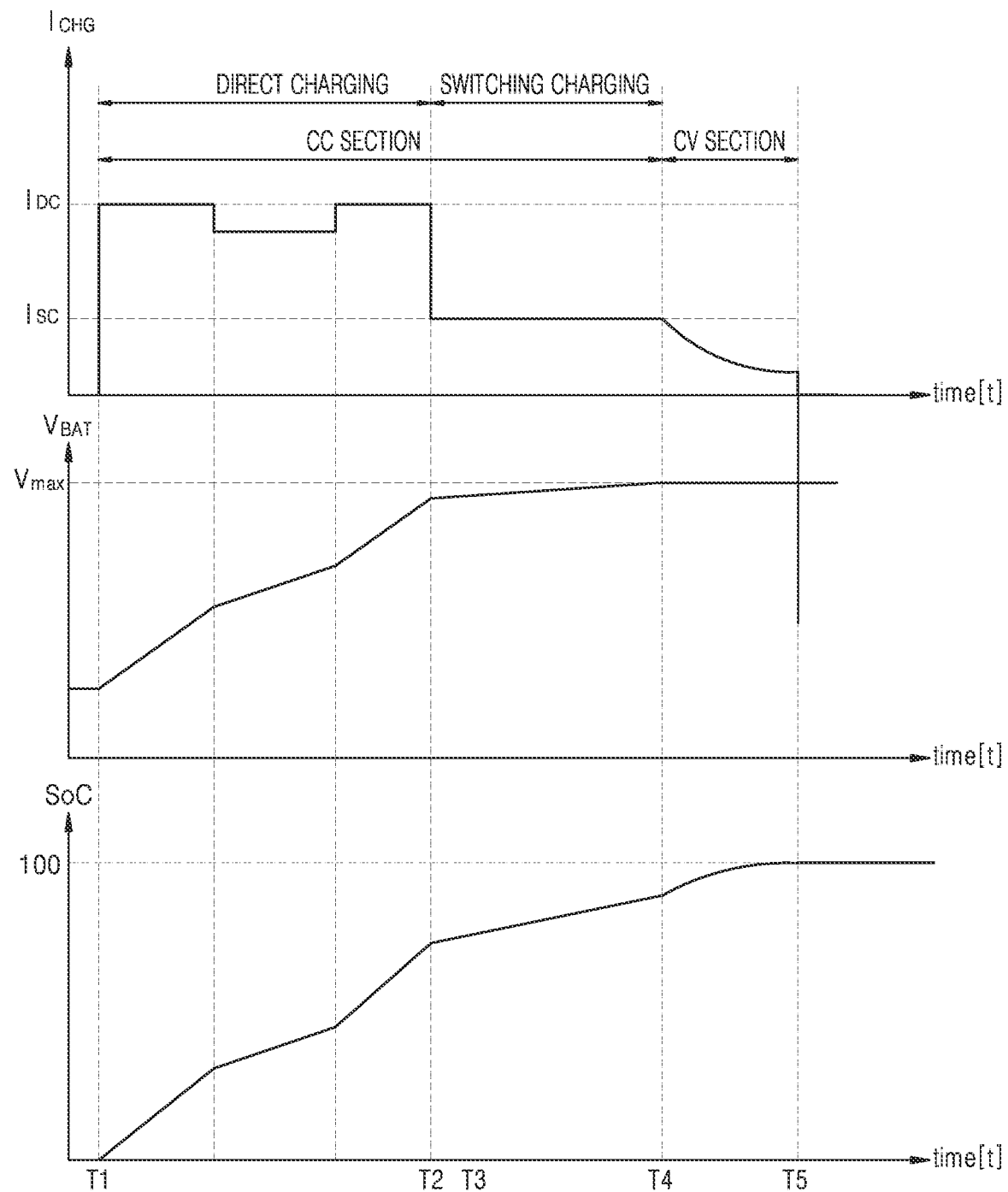

FIG. 14 is another waveform diagram illustrating relationships between signals during a battery charging process corresponding to the operating method of FIG. 13 according to an embodiment of the inventive concept.

Referring to FIG. 14, the charging IC 110 may perform charging using the direct charger 113 between time T1 and time T2 (a CC section of the battery charging process). In particular, the charging IC 110 may detect a hardwire connection between the travel adaptor 210 and the mobile device 100 at time T1. The direct charger 113 may be used to directly apply a charging voltage to the battery 130. Hence, the level of the charging current $I_{CHG}$ may be relatively high.

At time T2, the charging IC 110 may determine that the battery temperature exceeds the high threshold temperature. When the battery temperature obtained from the fuel gauge 116 is higher than the high threshold temperature, the direct charger 113 may decrease the charging current $I_{CHG}$. The operation of the charging IC 110 to decrease the charging current $I_{CHG}$ may be the same as method step S450 in FIG. 13.

At the time T3, the charging IC 110 may determine that the battery temperature exceeds the low threshold temperature. When the battery temperature obtained from the fuel gauge 116 is less than the low threshold voltage, the direct charger 113 may increase the charging current $I_{CHG}$. The operation of the charging IC 110 to increase the charging current $I_{CHG}$ may be the same as the method step S470 of FIG. 13.

At time T4, the charging IC 110 may identify disconnection between the external power unit 200 and the mobile device 100. Although the battery voltage $V_{BAT}$ has not reached the maximum battery voltage Vmax, the charging IC 110 may perform charging using the switching charger 114 in response to the disconnection detection.

From the foregoing it may be understood that an operating method for the charging IC 110 of FIG. 13 based on battery temperature may be simultaneously performed with the embodiment of FIG. 4A. And operating method of the charging IC 110 may be simultaneously applied with the embodiments of FIGS. 6, 8, and 10.

Figure 15:
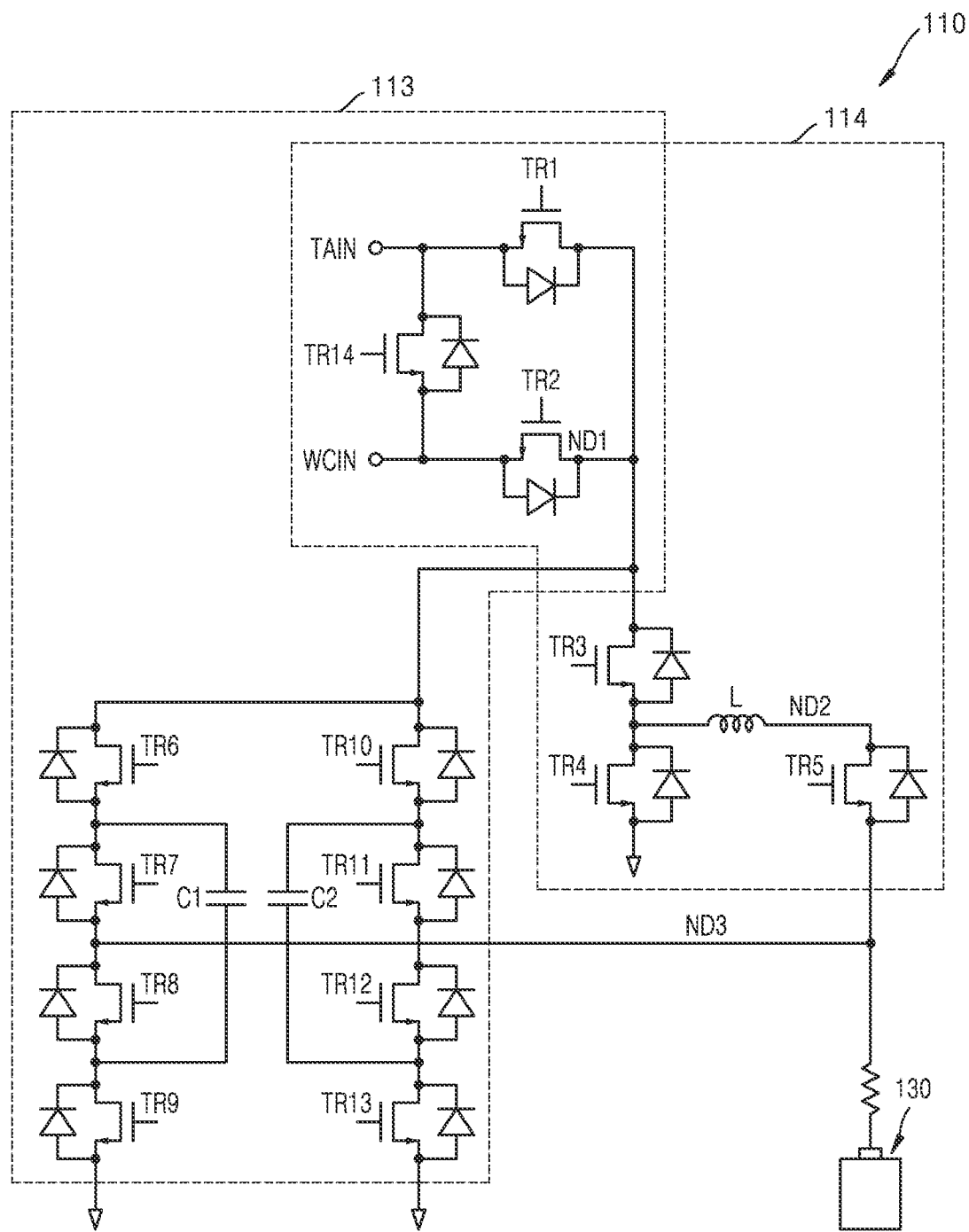

FIG. 15 is a circuit diagram further illustrating in another example the charging IC 110 integrated circuit corresponding to a case in which a wired or wireless input is short, according to an embodiment of the inventive concept.

Referring to FIG. 15, the charging IC 110 may include the switching charger 114, the direct charger 113, and the battery 130. The charging IC 110 of FIG. 15 may correspond to a modified example of the charging IC 110 shown in FIG. 3A.

According to various embodiments, a wired input terminal TAIN and a wireless input terminal WCIN may be shorted from each other. For example, when the charging IC 110 is embedded in an electronic device that does not support wireless charging, a charging efficiency may be improved by having the wireless input terminal WCIN and the wired input terminal TAIN shorted from each other. As the first transistor TR1 and the second transistor TR2 are connected in parallel, when seen from the wired input terminal TAIN, a value of an equivalent resistor may decrease, and efficiency of wired charging may be improved.

While the inventive concept has been particularly shown and described with reference to embodiments thereof, it will be understood that various changes in form details may be made therein without departing from the spirit and scope of the following claims.

What is claimed is:

1. A method of operating a charging integrated circuit (IC) in a mobile device including a battery, the method comprising:
   detecting a connection between the mobile device and an external power unit which is providing an external power signal;
   activating a direct charger to charge the battery;
   monitoring temperature information of the battery;
   determining, based on the temperature information, a temperature of the battery;
   based on the temperature of the battery exceeding a first threshold temperature, decreasing an amount of charging current;
   based on the temperature of the battery being less than the first threshold temperature, bypassing the decreasing of the amount of charging current;
   in response to detecting that a voltage level of the battery reaches a predetermined voltage level, performing a step constant current charging, wherein the step constant current charging comprises repeatedly decreasing the charging current when the voltage level of the battery reaches the predetermined voltage level; and
   in response to detecting that the charging current is less than a threshold charging current, deactivating the direct charger and activating a switching charger.

2. The method of claim 1, wherein the temperature information comprises at least one of the temperature of the battery, an internal temperature within the charging IC, an external temperature outside the charging IC, or an internal temperature within the mobile device.

3. The method of claim 1, wherein the decreasing of the amount of charging current further comprises transmitting, to the external power unit, a control signal for indicating a voltage drop of an output voltage from the external power unit.

4. The method of claim 1, wherein the switching charger and the direct charger are commonly integrated on a semiconductor substrate.

5. The method of claim 1, further comprising:
   after decreasing of the amount of charging current, determining, based on the temperature information, whether the temperature of the battery is less than a second threshold temperature;
   based on the temperature of the battery being less than the second threshold temperature, increasing the amount of charging current;
   based on the temperature of the battery exceeding the second threshold temperature, bypassing the increasing of the amount of charging current, wherein the first threshold temperature is greater than the second threshold temperature.

6. The method of claim 5, wherein the increasing of the amount of charging current further comprises transmitting, to the external power unit, a control signal for indicating a voltage step-up of an output voltage from the external power unit.

7. A charging integrated circuit (IC) in a mobile device including a battery, the charging IC comprising:
a control circuit;
a switching charger including at least one inductor; and
a direct charger including at least one capacitor,
wherein the control circuit is configured to:
detect a connection between the mobile device and an external power unit and a disconnection between the mobile device and the external power unit,
activate a direct charger to charge the battery,
monitor temperature information of the battery,
determine, based on the temperature information, a temperature of the battery,
based on the temperature of the battery exceeding a first threshold temperature, decrease an amount of charging current,
based on the temperature of the battery being less than the first threshold temperature, bypass the decreasing of the amount of charging current,
in response to detecting that a voltage level of the battery reaches a predetermined voltage level, perform a step constant current charging, wherein the step constant current charging comprises repeatedly decreasing the charging current when the voltage level of the battery reaches the predetermined voltage level, and
in response to detecting that the charging current is less than a threshold charging current, deactivate the direct charger and activate a switching charger.

8. The charging IC of claim 7, wherein the temperature information comprises at least one of the temperature of the battery, an internal temperature within the charging IC, an external temperature outside the charging IC, or an internal temperature within the mobile device.

9. The charging IC of claim 7, wherein the control circuit is further configured to generate a control signal for indicating a voltage drop of an output voltage from the external power unit, and transmit the control signal to the external power unit to decrease the amount of charging current.

10. The charging IC of claim 7, wherein the switching charger and the direct charger are commonly integrated on a semiconductor substrate.

11. The charging IC of claim 7, wherein the control circuit is further configured to:
after decreasing of the amount of charging current, determine, based on the temperature information, that the temperature of the battery is less than a second threshold temperature, wherein the first threshold temperature is greater than the second threshold temperature,
based on the temperature of the battery being less than the second threshold temperature, increase the amount of charging current,
based on the temperature of the battery exceeding the second threshold temperature, bypass the increasing of the amount of charging current.

12. The charging IC of claim 11, wherein the control circuit is further configured to generate a control signal for indicating a voltage step-up of an output voltage from the external power unit, and transmit the control signal to the external power unit to increase the amount of charging current.

13. A mobile device comprising:
a battery embedded in the mobile device; and
a charging integrated circuit (IC) chip including a direct charger and a switching charger,
wherein the charging IC is configured to:
detect a connection between the mobile device and an external power unit and a disconnection between the mobile device and the external power unit,
activate the direct charger to charge the battery,
monitor temperature information of the battery,
determine, based on the temperature information, a temperature of the battery,
based on the temperature of the battery exceeding a first threshold temperature, decrease an amount of charging current,
in response to detecting that a voltage level of the battery reaches a predetermined voltage level, perform a step constant current charging, wherein the step constant current charging comprises repeatedly decreasing the charging current when the voltage level of the battery reaches the predetermined voltage level, and
in response to detecting that the charging current is less than a threshold charging current, deactivate the direct charger and activate a switching charger.

14. The mobile device of claim 13, wherein the temperature information comprises at least one of the temperature of the battery, an internal temperature within the charging IC, an external temperature outside the charging IC, or an internal temperature within the mobile device.

15. The mobile device of claim 13, wherein the charging IC is further configured to generate a control signal for indicating a voltage drop of an output voltage from the external power unit, and transmit the control signal to the external power unit to decrease the amount of charging current.

16. The mobile device of claim 13,
wherein the switching charger and the direct charger are commonly integrated on a semiconductor substrate.

17. The mobile device of claim 13, wherein the charging IC is further configured to:
after decreasing of the amount of charging current, determine, based on the temperature information, whether the temperature of the battery is less than a second threshold temperature, wherein the first threshold temperature is greater than the second threshold temperature,
based on the temperature of the battery being less than the second threshold temperature, increase the amount of charging current.

18. The mobile device of claim 17, wherein the charging IC is further configured to generate a control signal for indicating a voltage step-up of an output voltage from the external power unit, and transmit the control signal to the external power unit to increase the amount of charging current.

* * * * *